US012792820B2

(12) United States Patent
Harper

(10) Patent No.: US 12,792,820 B2
(45) Date of Patent: Nov. 10, 2026

(54) INTERACTIVE VISUAL LOGFILE COMPARISON

(71) Applicant: Synopsys, Inc., Sunnyvale, CA (US)

(72) Inventor: James McDade Harper, Cedar Park, TX (US)

(73) Assignee: Synopsys, Inc., Sunnyvale, CA (US)

( * ) Notice: Subject to any disclaimer, the term of this patent is extended or adjusted under 35 U.S.C. 154(b) by 230 days.

(21) Appl. No.: 18/523,596

(22) Filed: Nov. 29, 2023

(65) Prior Publication Data

US 2025/0173499 A1 May 29, 2025

(51) Int. Cl.
*G06F 40/154* (2020.01)
*G06F 16/2457* (2019.01)
*G06F 40/137* (2020.01)
*G06F 40/205* (2020.01)

(52) U.S. Cl.
CPC ........ *G06F 40/154* (2020.01); *G06F 16/2457* (2019.01); *G06F 40/137* (2020.01); *G06F 40/205* (2020.01)

(58) Field of Classification Search
CPC .. G06F 40/154; G06F 16/2457; G06F 40/137; G06F 40/205; G06F 8/38; G06F 16/1815
See application file for complete search history.

(56) References Cited

U.S. PATENT DOCUMENTS

| | | | | |
|---|---|---|---|---|
| 9,753,798 | B1 * | 9/2017 | Haldorson .......... | G06F 11/0769 |
| 10,445,290 | B1 * | 10/2019 | Bunyan ............... | G06F 3/04842 |
| 10,796,051 | B1 * | 10/2020 | Marciano ............ | G06F 30/3323 |
| 2013/0227350 | A1 * | 8/2013 | O'Riordan .......... | G06F 11/3636 714/45 |
| 2013/0239076 | A1 * | 9/2013 | Carrion Schafer ... | G06F 30/327 716/105 |
| 2018/0246795 | A1 * | 8/2018 | Muthiah ................. | G06F 30/33 |
| 2019/0294753 | A1 * | 9/2019 | Pandey ................. | G06F 30/398 |
| 2019/0317837 | A1 * | 10/2019 | Fletcher .............. | G06F 11/3452 |
| 2021/0097448 | A1 * | 4/2021 | San Miguel Gonzalez ................. | G06N 20/20 |

* cited by examiner

*Primary Examiner* — Keith D Bloomquist
(74) *Attorney, Agent, or Firm* — WOMBLE BOND DICKINSON (US) LLP

(57) ABSTRACT

A method includes: receiving first structured data extracted from a first logfile generated by a first run of an electronic design automation process and second structured data extracted from a second logfile generated by a second run of the electronic design automation process; determining, by a processing device, based on the first structured data and the second structured data, that a first section of the first logfile and a second section of the second logfile correspond to outputs of a same stage of the electronic design automation process; extracting first metrics from the first section of the first logfile and second metrics from the second section of the second logfile; and generating a user interface to display the first metrics from the first section of the first logfile adjacent to the second metrics from the second section of the second logfile.

8 Claims, 18 Drawing Sheets

420

421 425 427 423

| QOR Heartbeats | WNS | | TNS | | R2RTNS | | NVE | | HTNS | | Leakage | | TotPower | | Area | |
|---|---|---|---|---|---|---|---|---|---|---|---|---|---|---|---|---|
| NPO_START | 0.329 | 0.879 | 18.57 | [illegible] | 18.56 | 10.65 | 105 | 157 | 21.54 | 362.83 | 160.87 | 159.76 | . | . | 123513 | 122983 |
| PRE_C_4 | . | . | 18.57 | [illegible] | 18.56 | 10.65 | . | . | 21.54 | 362.83 | 160.87 | 159.76 | . | . | 123513 | 122983 |
| PRE_C_5_[4] | . | . | . | 17.83 | . | 10.65 | . | . | . | 362.83 | . | 159.56 | . | . | . | 122913 |
| PRE_C_5_[5] | . | . | 18.57 | | 18.56 | . | . | . | 21.54 | . | 160.24 | . | . | . | 123244 | . |
| PRE_C_6 | . | . | 18.57 | [illegible] | 18.56 | 9.73 | . | . | 21.54 | 362.83 | 162.52 | 161.84 | . | . | 123439 | 123124 |
| PRE_C_7_[28] | . | . | 18.57 | [illegible] | 18.56 | 9.73 | . | . | 21.54 | 362.83 | 158.89 | 158.68 | . | . | 123436 | 123118 |
| PRE_C_8_[14] | . | . | 18.57 | [illegible] | 18.56 | 9.73 | . | . | 21.54 | 362.83 | 159.45 | 164.18 | . | . | 123608 | 123521 |
| PRE_C_9 | . | . | 18.22 | 7.67 | 18.22 | 7.81 | . | . | 21.54 | 362.83 | 159.47 | 164.18 | . | . | 123608 | 123521 |
| PRE_C_10 | . | . | 18.21 | 7.67 | 18.21 | 7.60 | . | . | 21.54 | 362.83 | 159.76 | 163.98 | . | . | 123545 | 123428 |
| PRE_C_11 | . | . | 18.21 | 7.67 | 18.21 | 7.60 | . | . | 21.54 | 362.83 | 157.39 | 160.39 | . | . | 123121 | 123026 |
| PRE_C_12_[4] | . | . | 18.21 | 7.67 | 18.21 | 7.60 | . | . | 21.54 | 362.83 | 144.87 | 147.43 | . | . | 122655 | 122652 |

FIG. 4C

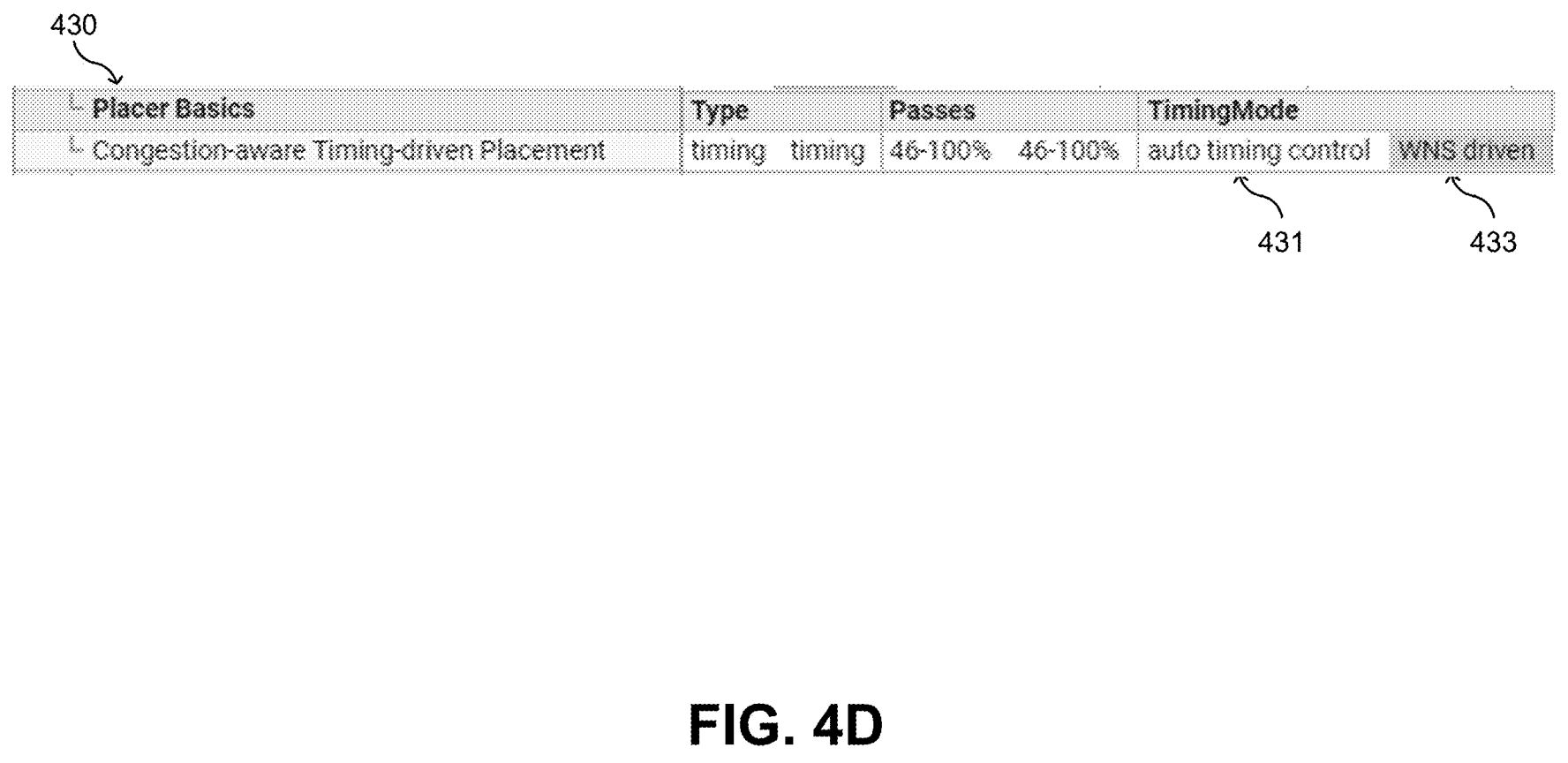

430

| Placer Basics | Type | | Passes | | TimingMode | |
|---|---|---|---|---|---|---|
| Congestion-aware Timing-driven Placement | timing | timing | 46-100% | 46-100% | auto timing control | WNS driven |

431

433

FIG. 4D

440

Values

| QOR Heartbeats | TNS 1 | TNS 2 | R2RTNS 1 | R2RTNS 2 | Leakage 1 | Leakage 2 |
|---|---|---|---|---|---|---|
| PRE_C_6 | 18.57 | 16.95 | 18.56 | 9.73 | 162.52 | 161.84 |
| PRE_C_7_[28] | 18.57 | 16.95 | 18.56 | 9.73 | 158.89 | 158.68 |
| PRE_C_8_[14] | 18.57 | 16.95 | 18.56 | 9.73 | 159.45 | 164.18 |

441

Percent delta from baseline

| | | | | | | |
|---|---|---|---|---|---|---|
| PRE_C_6 | 18.57 | -8.7% | 18.56 | -47.6% | 162.52 | -0.4% |
| PRE_C_7_[28] | 18.57 | -8.7% | 18.56 | -47.6% | 158.89 | -0.1% |
| PRE_C_8_[14] | 18.57 | -8.7% | 18.56 | -47.6% | 159.45 | 3.0% |

443

Absolute delta from baseline

| | | | | | | |
|---|---|---|---|---|---|---|
| PRE_C_6 | 18.57 | -1.62 | 18.56 | -8.83 | 162.52 | -0.68 |
| PRE_C_7_[28] | 18.57 | -1.62 | 18.56 | -8.83 | 158.89 | -0.21 |
| PRE_C_8_[14] | 18.57 | -1.62 | 18.56 | -8.83 | 159.45 | +4.73 |

445

FIG. 4E

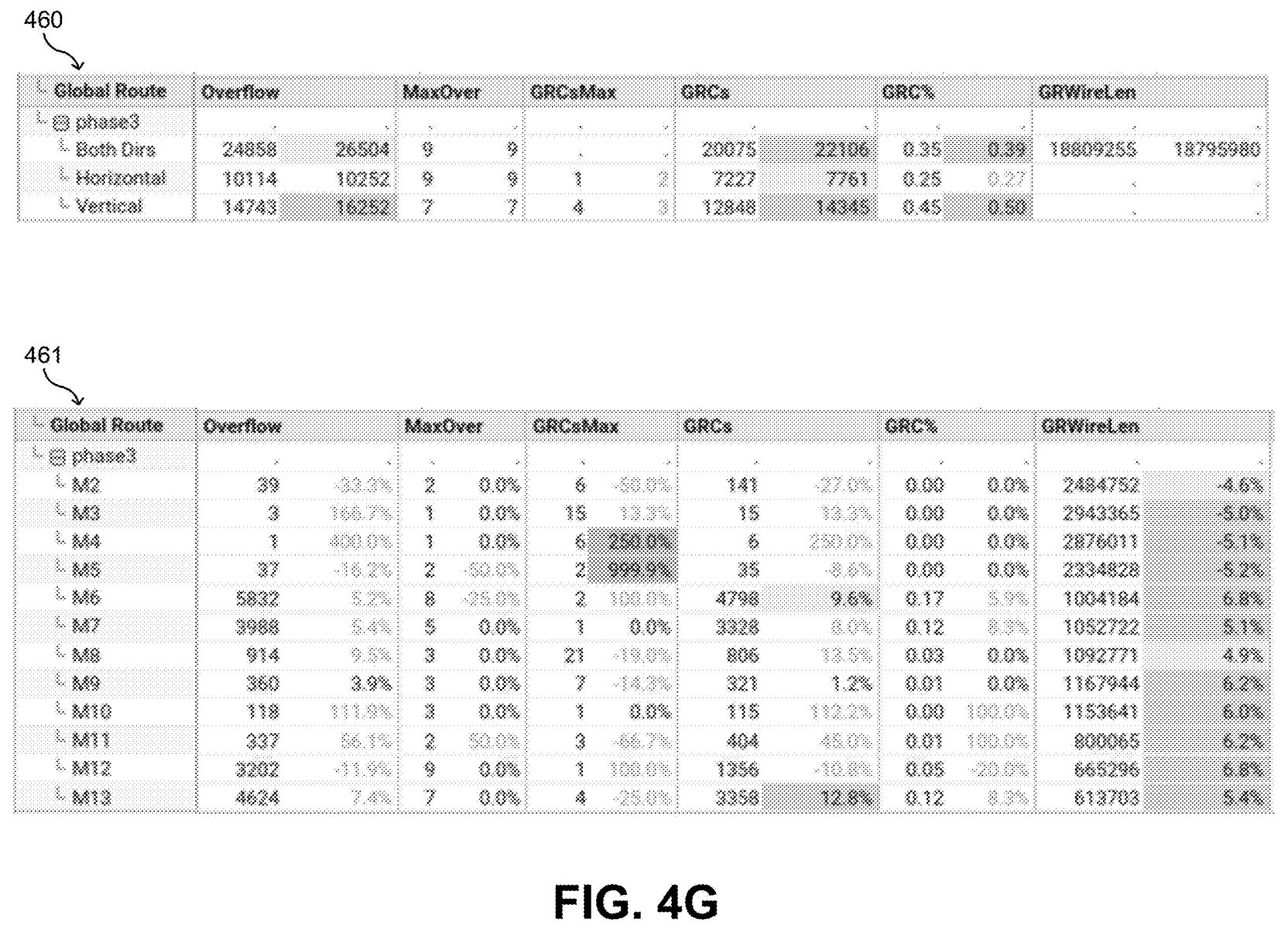

460

| Global Route | Overflow | | MaxOver | | GRCsMax | | GRCs | | GRC% | | GRWireLen | |
|---|---|---|---|---|---|---|---|---|---|---|---|---|
| phase3 | | | | | | | | | | | | |
| Both Dirs | 24858 | 26504 | 9 | 9 | | | 20075 | 22106 | 0.35 | 0.39 | 18809255 | 18795980 |
| Horizontal | 10114 | 10252 | 9 | 9 | 1 | 2 | 7227 | 7761 | 0.25 | 0.27 | | |
| Vertical | 14743 | 16252 | 7 | 7 | 4 | 3 | 12848 | 14345 | 0.45 | 0.50 | | |

461

| Global Route | Overflow | | MaxOver | | GRCsMax | | GRCs | | GRC% | | GRWireLen | |
|---|---|---|---|---|---|---|---|---|---|---|---|---|
| phase3 | | | | | | | | | | | | |
| M2 | 39 | -33.3% | 2 | 0.0% | 6 | -50.0% | 141 | -27.0% | 0.00 | 0.0% | 2484752 | -4.6% |
| M3 | 3 | 166.7% | 1 | 0.0% | 15 | 13.3% | 15 | 13.3% | 0.00 | 0.0% | 2943365 | -5.0% |
| M4 | 1 | 400.0% | 1 | 0.0% | 6 | 250.0% | 6 | 250.0% | 0.00 | 0.0% | 2876011 | -5.1% |
| M5 | 37 | -16.2% | 2 | -50.0% | 2 | 999.9% | 35 | -8.6% | 0.00 | 0.0% | 2334828 | -5.2% |
| M6 | 5832 | 5.2% | 8 | -25.0% | 2 | 100.0% | 4798 | 9.6% | 0.17 | 5.9% | 1004184 | 6.8% |
| M7 | 3988 | 5.4% | 5 | 0.0% | 1 | 0.0% | 3328 | 8.0% | 0.12 | 8.3% | 1052722 | 5.1% |
| M8 | 914 | 9.5% | 3 | 0.0% | 21 | -19.0% | 806 | 13.5% | 0.03 | 0.0% | 1092771 | 4.9% |
| M9 | 360 | 3.9% | 3 | 0.0% | 7 | -14.3% | 321 | 1.2% | 0.01 | 0.0% | 1167944 | 6.2% |
| M10 | 118 | 111.9% | 3 | 0.0% | 1 | 0.0% | 115 | 112.2% | 0.00 | 100.0% | 1153641 | 6.0% |
| M11 | 337 | 56.1% | 2 | 50.0% | 3 | -66.7% | 404 | 45.0% | 0.01 | 100.0% | 800065 | 6.2% |
| M12 | 3202 | -11.9% | 9 | 0.0% | 1 | 100.0% | 1356 | -10.8% | 0.05 | -20.0% | 665296 | 6.8% |
| M13 | 4624 | 7.4% | 7 | 0.0% | 4 | -25.0% | 3358 | 12.8% | 0.12 | 8.3% | 613703 | 5.4% |

FIG. 4G

INTERACTIVE VISUAL LOGFILE COMPARISON

TECHNICAL FIELD

The present disclosure relates to analyses and user interfaces for visual comparison of logfiles.

BACKGROUND

Many software programs generate output in the form of log files (or logfiles). These logfiles are produced in addition to some primary output, and are used to record, for example, events occurring during the operation of the software and other metadata associated with the process of producing the primary output. Users and software developers may inspect the logfiles to analyze the primary output of the software program, such as identifying ways to improve the quality of the primary output or to identify the root causes of errors in the underlying software program.

The above information disclosed in this Background section is only for enhancement of understanding of the present disclosure, and therefore it may contain information that does not form the prior art that is already known to a person of ordinary skill in the art.

SUMMARY

Aspects of embodiments of the present disclosure relate to systems and methods for interactive visual logfile comparison.

According to one embodiment of the present disclosure, a method includes: receiving first structured data extracted from a first logfile generated by a first run of an electronic design automation process and second structured data extracted from a second logfile generated by a second run of the electronic design automation process; determining, by a processing device, based on the first structured data and the second structured data, that a first section of the first logfile and a second section of the second logfile correspond to outputs of a same stage of the electronic design automation process; extracting first metrics from the first section of the first logfile and second metrics from the second section of the second logfile; and generating a user interface to display the first metrics from the first section of the first logfile adjacent to the second metrics from the second section of the second logfile.

The first section may have a position in the first logfile different from a position of the second section in the second logfile, and the first structured data may be generated by parsing the first logfile, including: identifying a first workflow step start marker at a first position in the first logfile; and determining the position of the first section in the first logfile based on the first position of the first workflow step start marker, and the second structured data may be generated by parsing the second logfile, including: identifying a second workflow step start marker at a second position in the second logfile; and determining the position of the second section in the second logfile based on the second position of the second workflow step start marker.

The parsing of the first logfile may be performed concurrently with the first run of the electronic design automation process.

The user interface may include a control configured to select a display mode from a plurality of display modes for displaying the second metrics, the plurality of display modes including: a raw value of a second metric of the second metrics; a percentage change between the raw value of the second metric and a corresponding metric of a baseline run; and an absolute change between the raw value of the second metric and the corresponding metric of the baseline run.

The user interface may be implemented using hypertext document and a stylesheet, a node of hypertext document corresponding to the second metric may include a plurality of sub-nodes storing the raw value, the percentage change, and the absolute change, and an interaction with the control of the user interface may cause the user interface to modify the stylesheet to make one of sub-nodes visible and to hide the other sub-nodes.

The user interface may include a control configured to select a run of a plurality of runs of the electronic design automation process as the baseline run.

The method may further include: receiving a plurality of first messages extracted from the first logfile and a plurality of second messages extracted from the second logfile; grouping the plurality of first messages and the plurality of second messages by message type to generate a first plurality of groups of messages from the first logfile and a second plurality of groups of messages from the second logfile; generating summaries of the first plurality of groups of messages and summaries of the second plurality of groups of messages, a summary of a group of messages including a count of messages in the group and a representative example message from the group of messages; and highlighting, in the user interface, a difference between a first summary of a first group of messages from the first logfile and a second summary of a second group of messages from the second logfile.

The first metrics may include a first plurality of subtables of metrics and the second metrics include a second plurality of subtables of metrics, the first plurality of subtables of metrics and the second plurality of subtables of metrics corresponding to sub-stages of the same stage of the electronic design automation process, and the user interface may display metrics from the first plurality of subtables adjacent to corresponding metrics from the second plurality of subtables in a hierarchy by section in order of the electronic design automation process.

According to one embodiment of the present disclosure, a system includes: a memory storing instructions; and a processor, coupled with the memory and to execute the instructions, the instructions when executed cause the processor to: receive structured data extracted from a logfile generated by a run of an electronic design automation process on an iteration of an integrated circuit design, the structured data including a plurality of sections corresponding to stages of the electronic design automation process; extract a plurality of subtables of metrics from the plurality of sections; and generate an interactive user interface report to display the plurality of subtables of metrics hierarchically by section in order of the electronic design automation process.

A first subtable of the plurality of subtables may include metrics of a first plurality of types of metric data and a second subtable of the plurality of subtables includes metrics of a second plurality of types of metric data different from the first plurality of types of metric data, and the interactive user interface report may include: a first portion including a first header identifying the first plurality of types of metric data and metrics from the first subtable; and a second portion including a second header identifying the second plurality of types of metric data and metrics from the second subtable.

The user interface may be configured to: maintain the display of the first header while any portion of the metrics from the first subtable are visible in the user interface; and maintain the display of the second header while any portion of the metrics from the second subtable are visible in the user interface.

The first subtable may include metrics written to the logfile during a first stage of the electronic design automation process, the second subtable may include metrics written to the logfile after a first plurality of the metrics of the first subtable written to the logfile during the first stage and before a second plurality of the metrics of the first subtable written to the logfile during the first stage, and the second subtable may split the first subtable in the interactive user interface report.

The interactive user interface report may further include: a third portion including the first header identifying the first plurality of types of metric data and additional metrics from the first subtable, and the second portion including the metrics from the second subtable may be displayed in the user interface between: the first portion including the metrics from the first subtable; and the third portion including the additional metrics from the first subtable.

The user interface may be configured to: maintain the display of the first header in the first portion while any of the metrics from the first subtable are visible in the user interface; maintain the display of the first header in the third portion while any of the additional metrics from the first subtable and the second subtable are visible in the user interface; and maintain the display of the second header in the second portion while any of the metrics from the second subtable are visible in the user interface.

The memory may further store instructions that when executed cause the processor to: receive second structured data extracted from a second logfile generated by a second run of the electronic design automation process on a second iteration of the integrated circuit design, the second structured data including a second plurality of sections corresponding to the stages of the electronic design automation process; extract a second plurality of subtables of metrics from the second plurality of sections of the second logfile; and determine correspondences between the plurality of sections of the structured data and the second plurality of sections of the second structured data, and the interactive user interface report may further display metrics from the second plurality of subtables of metrics adjacent to corresponding metrics from the plurality of subtables of metrics.

According to one embodiment of the present disclosure, a non-transitory computer-readable medium includes stored instructions, which when executed by a processor, cause the processor to: receive first structured data extracted from a first logfile generated by a first run of an electronic design automation process on a first iteration of an integrated circuit design, the first structured data including a first plurality of sections corresponding to stages of the electronic design automation process; receive second structured data extracted from a second logfile generated by a second run of the electronic design automation process on a second iteration of the integrated circuit design, the second structured data including a second plurality of sections corresponding to the stages of the electronic design automation process; generate an interactive user interface report to display: first metrics from the first plurality of sections of the first structured data hierarchically in order of the electronic design automation process; and second metrics from the second plurality of sections of the second structured data adjacent to the first metrics from corresponding sections of the first plurality of sections of the first structured data.

The interactive user interface report may include a user interface control to toggle between an expanded view and a collapsed view of a portion of the interactive user interface report displaying metrics from a first section of the first logfile and a corresponding second section of the second logfile, the first section and the corresponding second section corresponding to a same stage of the electronic design automation process, the expanded view may display first raw values from the first section of the first logfile and second raw values from the corresponding second section of the second logfile, and the collapsed view may display a plurality of first summary metrics computed from the first raw values and second summary metrics computed from the second raw values.

The interactive user interface report may highlight a second metric of the second metrics, the second metric differing in value from a corresponding first metric of the first metrics by at least a threshold value.

The interactive user interface report may highlight a second non-numerical metric of the second metrics, the second non-numerical metric differing in value from a corresponding first non-numerical metric of the first metrics.

The first metrics may include a first plurality of subtables of metrics and the second metrics may include a second plurality of subtables of metrics, the first plurality of subtables of metrics and the second plurality of subtables of metrics corresponding to sub-stages of a same stage of the electronic design automation process, and the interactive user interface report may displays metrics from the first plurality of subtables adjacent to corresponding metrics from the second plurality of subtables in a hierarchy by section in order of the electronic design automation process.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIG. 4C is a screenshot of a portion of a user interface displaying a portion of a report of data extracted from logfiles corresponding to numeric metrics representing the quality of the output from two different runs, according to one embodiment of the present disclosure.

FIG. 4D is a screenshot of a portion of a report highlighting differences in non-numerical data, according to one embodiment of the present disclosure.

FIG. 4E is a screenshot of a portion of a user interface showing three different modes for displaying comparisons of numeric metrics representing the quality of the output from two different runs, according to one embodiment of the present disclosure.

FIG. 4G includes screenshots of a portion of a user interface showing summary metrics and expanded detailed metrics, according to one embodiment of the present disclosure.

DETAILED DESCRIPTION

Figure 1:
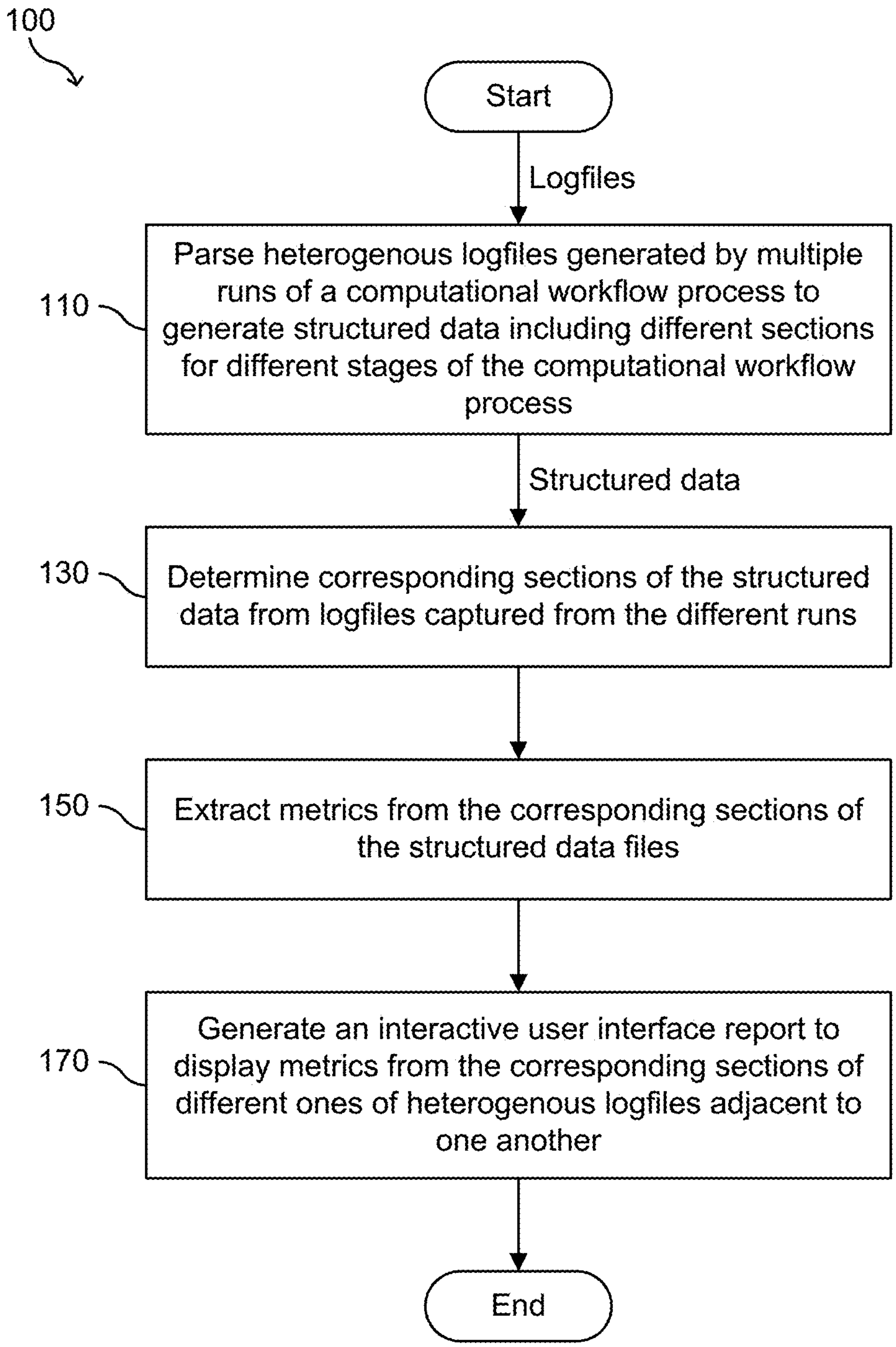
FIG. 1 is a flowchart depicting a method for processing logfiles and generating a comparison between logfiles, according to embodiments of the present disclosure.

Aspects of the present disclosure relate to interactive logfile comparison.

Software programs generate logging outputs as they execute and save these outputs to log files (also referred to as logfiles). These log files may have a form of plain text, e.g., represented in a character encoding such as the American Standard code for Information Interchange (ASCII) or Unicode (e.g., a Unicode Transformation Format such as UTF-8).

In some contexts, software programs for electronic design automation (EDA) for developing integrated circuit (IC) designs generate logfiles that record, for example: the sequence of steps or commands that was run by the software programs; the configuration of these steps or commands (e.g., user-specified parameters or parameters that were automatically set based on the input); the results of each step (e.g., a quality of results or QOR metric or other numerical metrics representing the quality of the output, performance metrics such as runtime and memory usage when performing that step, and the like); and errors or warnings generated during the run. (Examples of EDA processes are described in more detail below in reference to FIG. 6.).

However, the logfiles generated by software programs for EDA can be hundreds of thousands to millions of lines of text for a given execution (or run), corresponding to generating a single version of an integrated circuit design. These logfiles include information generated through many nested and overlapping relationships between sequences of steps and commands run by a given program, yet may also lack structure (e.g., a formal hierarchical structure). In addition, the logfiles may include many thousands of repetitive warnings or errors, which can bury other warning and errors that may be more relevant. The large size and complex relationships of the data in these logfiles are among the factors that make it impractical for a human engineer to manually review a logfile for a given run, let alone compare the logfiles from two or more different runs of the program. The large size and complexity of the logfiles also makes it very difficult for a user to understand the output of text comparison software (e.g., diff), and therefore a manual review may involve opening multiple logfiles side-by-side in two different windows of a text editor (in a text-based terminal interface or a graphical user interface), then manually searching the text of the logfiles and scrolling through the windows to find values to compare between the different logfiles.

These challenges make it difficult for a user to compare the results from two or more different executions of EDA processes to generate different versions or iterations of an integrated circuit design, such as to explore the tradeoffs in the quality of the results due to changing some configuration parameters or making some different choices in the design. Manually reading logfiles to compare results is a skill that some engineers develop over time, so inexperienced users may be completely unable to interpret logfiles and may rely on the assistance of more experienced engineers. However, the size and complexity of these logfiles can even mislead experienced users (e.g., engineers). Furthermore, metrics for comparison, such as the quality of result metrics, are spread across the hundreds of thousands to millions of lines of the log file and may be in different locations in the different logfiles from different runs (e.g., due to different numbers of preceding lines of text), and determining whether one metric is better than the other is often a complex, multi-factor analysis involving data from different parts of the logfile.

Accordingly, aspects of embodiments of the present disclosure relate to automatically analyzing logfiles to extract data and providing user interfaces for visual comparison of heterogenous, time sequenced logfiles based on these analyses. These logfiles are heterogenous in that different portions or sections of the logfile have different formats, which correspond to the outputs of different commands or tools. The logfiles are time sequenced in that data in the logfiles appear in the order in which steps or commands of a process are executed (e.g., in the order in which sub-stages or steps are executed during a run of an EDA process for generating an integrated circuit design). Some aspects of embodiments of the present disclosure relate to automatically analyzing multiple logfiles to identify corresponding sections (e.g., sections from two different logfiles that contain the output of the same step in an EDA process), then presenting corresponding sections of the logfiles together, such that corresponding data values (e.g., some corresponding quality of result metric for an aspect of an integrated circuit design) from different logfiles can be easily compared. Different sections of the logfiles may have different formatting, and therefore some aspects of embodiments relate to using dedicated parsers for extracting data from corresponding sections. Aspects of embodiments of the present disclosure further relate to visually distinguishing portions of the logfiles that are identified, through the automatic analysis, as being more salient or important for the user (e.g., identifying differences in warnings or error messages generated in the two different logfiles, suppressing or collapsing or summarizing repetitive error messages into a representative example, and the like).

Technical advantages of embodiments of the present disclosure include, but are not limited to, automatically generating comparisons of logfiles from different runs of an electronic design automation (EDA) process for generating integrated circuit designs. Some aspects of embodiments of the present disclosure relate to detecting corresponding sections and corresponding data values (e.g., quality of result metrics) between two or more different logfiles and presenting those corresponding data values adjacent to one another in a user interface, thereby allowing users to easily and visually compare the results of different runs.

This improves the processes for designing integrated circuits, and for other similar processes involving extensive, heterogenous, time sequenced logfiles, by providing users with easy-to-understand representations of the differences between different logfiles. This improves an EDA process (or other processes) by revealing potential tradeoffs between the results of different runs, without requiring the engineers to search through thousands or millions of lines of logfiles. This time savings and cost savings reduces the turnaround time and expense associated with designing integrated circuits (or other engineering processes), thereby allowing such products to be developed more quickly and with higher quality.

Aspects of embodiments of the present disclosure relate to methods for analyzing multiple logfiles and generating representations of the data contained in the multiple logfiles, where depictions of these representations in a user interface allow for easy comparison of the logfiles. These representations include streamlined access to logfile data, visual markup to identify quality of result metric shifts between runs, hierarchical representation of the processes logged in the logfiles (e.g., hierarchical representation of stages and sub-stages of an EDA process), streamlined capture of automatically generated messages (e.g., info, warning, and error messages), organization of data into sub-tables to clarify the connections between different tool commands and engines, dynamic display of relevant table or sub-table headers, summary views of the data in the logfiles, reducing clutter by collapsing or separating frequently-used metrics from infrequently-used metrics, incremental capture and analysis of logfiles during runs, separate customizable logfile parsers for different sections of the heterogeneous logfiles, prescriptive guidance based on logfile trajectories, and performant re-rendering of user interfaces when using a web browser or web browser engine as framework for providing a front-end user interface.

Figure 7:
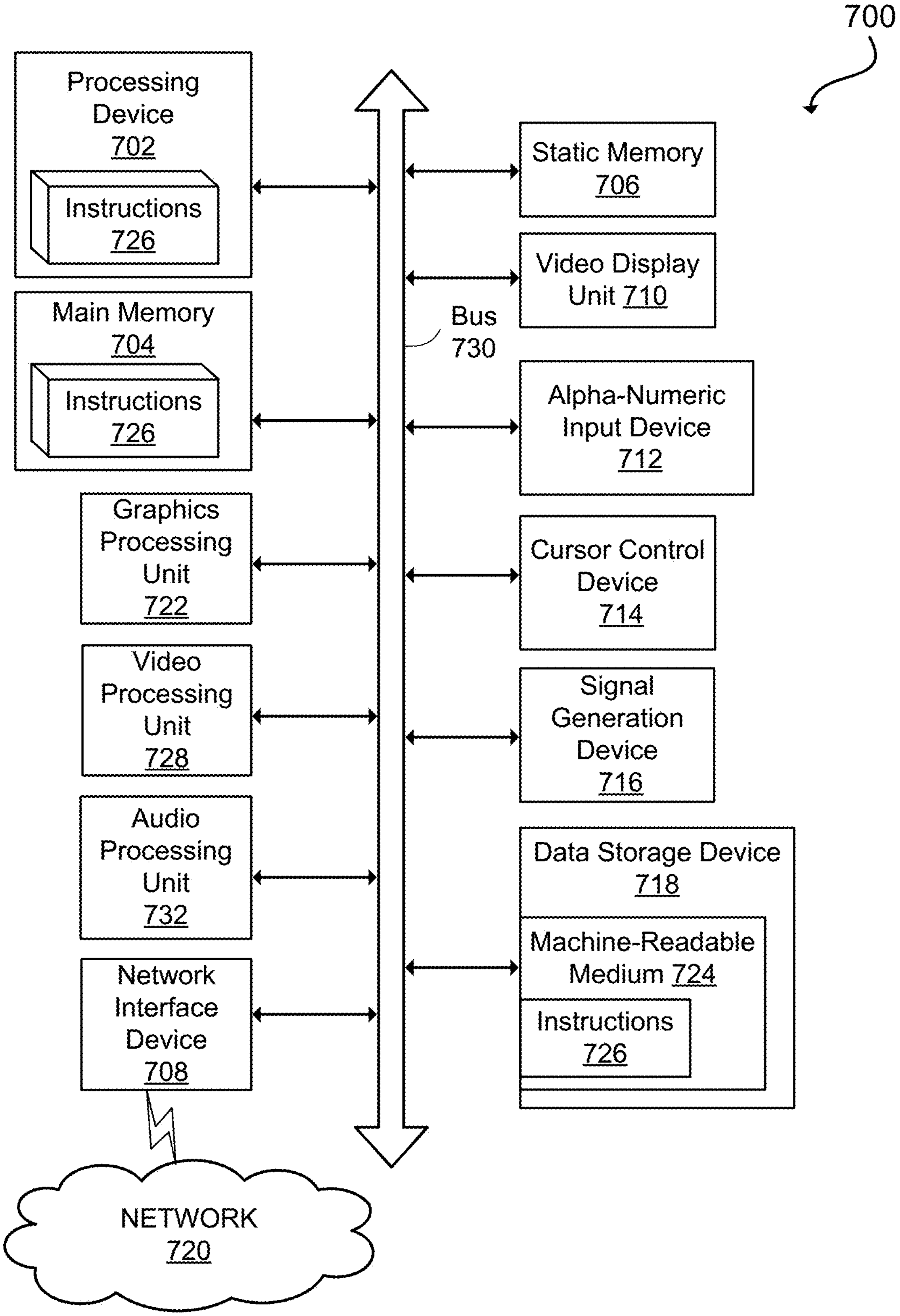
FIG. 7 depicts a diagram of an example computer system in which embodiments of the present disclosure may operate.

FIG. 1 is a flowchart depicting a method 100 for processing logfiles and generating a comparison between logfiles, according to one embodiment of the present disclosure. The method 100 may be performed by a computer system, such as the computer system 700 described below with respect to FIG. 7. For example, the method may be implemented using program instructions stored in a non-volatile or non-transitory memory of the computer system 700 and executed by a processing device (e.g., a microprocessor, central processing unit, or the like) where the instructions configure the computer system 700 into a special purpose device that performs methods in accordance with embodiments of the present disclosure. While FIG. 7 depicts a single computer system, embodiments of the present disclosure are not limited thereto and may be implemented in a manner that is distributed across different computers (e.g., where different portions of the method are performed by different computer systems and/or where multiple computer systems concurrently perform a same step on different data).

As shown in FIG. 1, at 110 the processing device parses heterogenous, time sequenced logfiles generated by multiple runs of a computational process to generate structured data including different sections corresponding to different stages of the computational process. For the sake of convenience of description, various aspects of embodiments of the present disclosure are presented in a context where the computational process is an electronic design automation (EDA) process for generating a design of an integrated circuit based on input specifications (e.g., as expressed in a hardware description language). Examples of EDA processes are described in more detail below with respect to FIG. 6. However, embodiments of the present disclosure are not limited thereto and can be applied to analyses of logfiles generated by runs of computational workflows.

Figure 6:
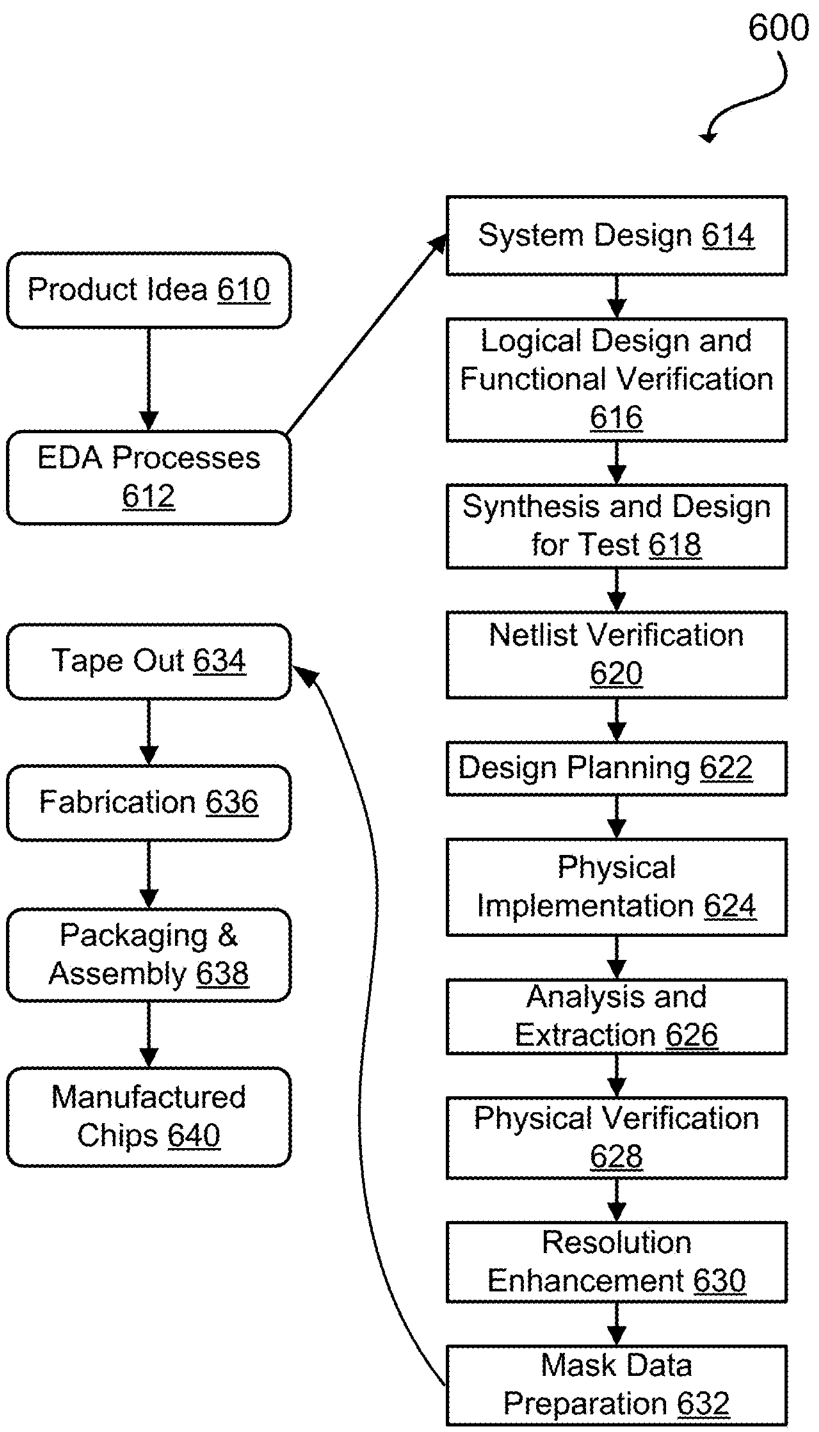
FIG. 6 depicts a flowchart of various processes used during the design and manufacture of an integrated circuit in accordance with some embodiments of the present disclosure.

Different stages or sub-processes of the EDA process may use different software programs to perform operations, where the output of one stage is provided as input to a following stage in the EDA process. As one example, FIG. 6 shows a layout or physical implementation stage 624. This stage may include various sub-portions, including initial placement, initial design rule checking (DRC), initial optimization, final placement, and final optimization. During and between executing these different sub-portions, the software program logs information regarding the execution of the stage on the integrated circuit design. For example, the initial DRC sub-portion may generate messages such as warnings and errors regarding the initial placements (positioning) of circuit structures in the layout of the integrated circuit design. As another example, the initial optimization and final optimization sub-portions may each be followed by a quality of result (QOR) analysis that measures the quality of the placements and routing of connections (wires) between the circuit structures as numeric values. These quality metrics include, for example: congestion metrics (e.g., routing overflow, placement congestion, global congestion, local congestion, and the like); and timing metrics (e.g., total negative slack, worst hold slack, and the like).

Different stages and sub-stages of the EDA processes may append to the same logfile or write data into different logfiles. The different software programs executed in different stages may log text data to the logfiles in data formats that are specific to those software programs, such that the resulting logfiles may lack overall structure, but where the data is time sequenced in that the data appears in order in which the operations are performed on the integrated circuit design. For example, a quality of result analysis software program may execute after the initial placement, initial optimization, final placement, and final optimization sub-stages of the physical implementation stage. The quality of result metrics generated after each sub-stage may have the same format, which may make it difficult for a user to determine which sub-stage a given set of quality of result metrics are associated with, and may therefore make it difficult to compare quality of result metrics between different runs of the EDA process on related integrated circuit designs, especially because the number of other lines of logs generated by the sub-stages may vary. Furthermore, even if a user determined there was a difference in a quality of result metrics between two different runs, the lack of structure in the logfile makes it difficult to identify a cause for that difference in the value of the quality of result metric.

Accordingly, at 110, the processing device analyzes the heterogenous, time sequenced logfiles to generate structured data based on identifying sections written by different software programs during the different stages of the EDA process and extracting data metrics from the different sections based on the data formats applied by the corresponding software programs to generate structured data representing the input logfiles.

Figure 2:
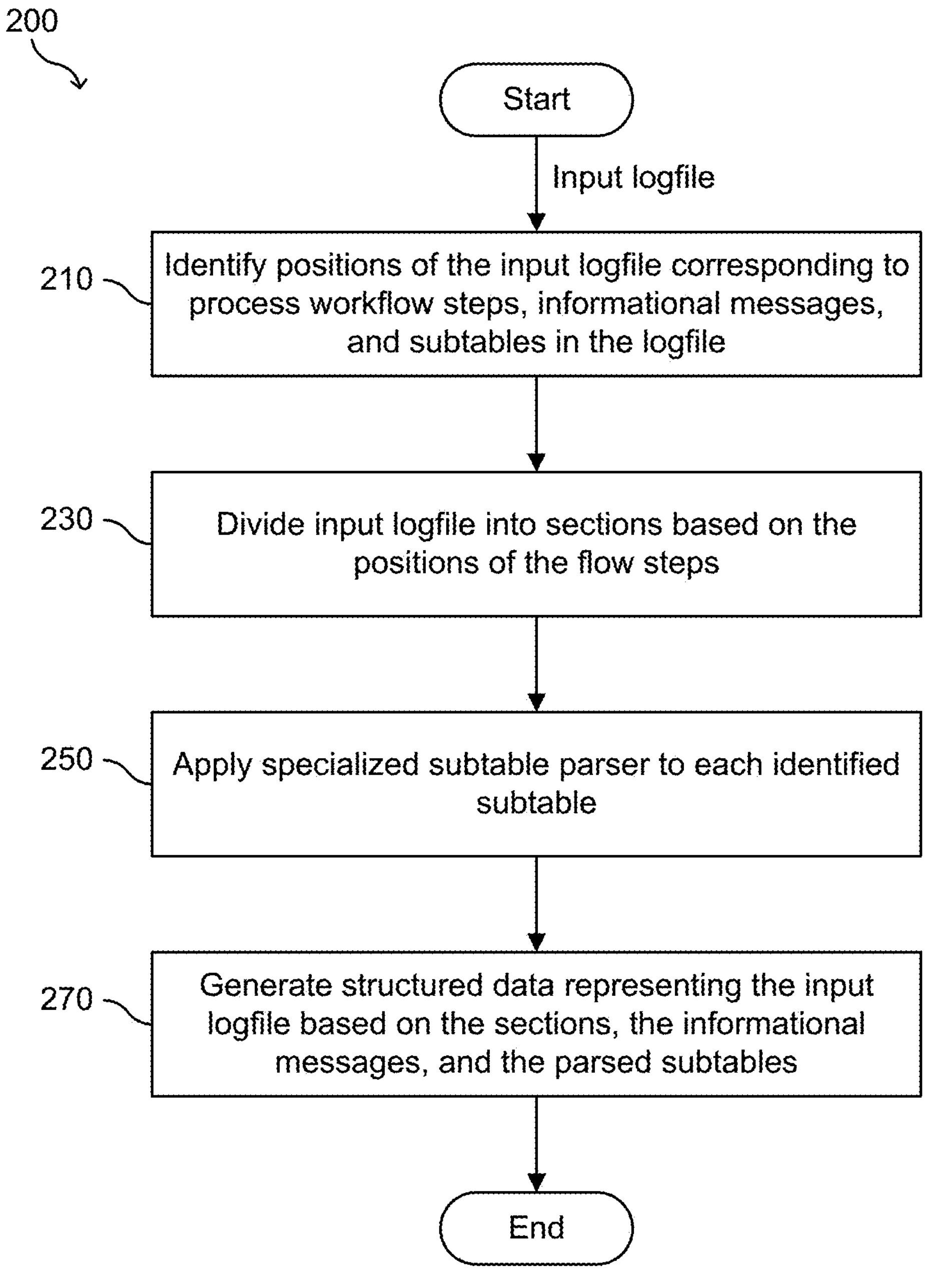
FIG. 2 is a flowchart depicting a method 200 for processing a logfile, according to embodiments of the present disclosure.

FIG. 2 is a flowchart depicting a method 200 for processing a logfile, according to one embodiment of the present disclosure. In some embodiments of the present disclosure, a logfile is parsed using a two-pass approach to capture all relevant data. In the first pass, at 210, the processing device runs a fast parsing to identify different categories of logfile data and their positions (e.g., offset from the start of the logfile in bytes or in number of lines) within the logfile. In some embodiments, these categories include a workflow step marker category, an informational message category, and a subtable identifier category.

Workflow step markers are messages that mark the start and end of the most significant steps in the overall process workflow (e.g., the stages of the EDA process such as that described with respect to FIG. 6). In particular, these messages are expected to be written to the logfiles by software programs at the starts and ends of their execution, thereby marking off different sections of the logfiles.

Informational messages are one-liner information (info), warning, and error messages that convey information about the configuration of the command or step or stage or sub-stage that is being performed and whether anything went wrong while the corresponding portion of the process was running. Lines of the logfile containing these messages may begin with prefixes such as INFO, WARNING, ERR, and the like. However, in some embodiments of the present disclosure, the parsers are configurable to detect other keywords or identifiers that are used by software programs to label logged messages.

Subtable identifiers mark the starts (and, in some cases, ends) of data that are logged and that are specific to a sub-component of the data output by a stage, sub-stage, command, or software program. In some embodiments, these subtables correspond to major stages of the overall computational process—in an EDA process, these different subtables may correspond to optimization, global placement, legalization, high-fanout synthesis, multibit banking, etc., which may all output data in different formats. In addition, sub-stages may have multiple sub-tables. For example, a detailed routing step may include multiple subtables such as a routing summary subtable, a design-rule violation categories subtable, a wirelength subtable, and the like, which all output different data in different formats.

In some embodiments, portions of the input logfile corresponding to these different categories are determined based on a parsing analysis, such as by using pattern matching (e.g., patterns specified using regular expressions) to classify individual lines of the input logfile to the various categories described above. In some embodiments, this analysis is performed on a per-line basis, which reduces the runtime and memory overhead (e.g., because the parser need only analyze the text up to the next newline or end of line (EOL) or line break or carriage return and line feed (CRLF) character or characters in the logfile), enabling high speed processing of the logfiles during the first pass at 210, which is notable in circumstances where the logfiles can have hundreds of thousands to millions of lines of text, such as the logfiles generated by runs of EDA processes.

At 230, the processing device begins a second pass of the input logfile by dividing the input logfile into sections based on the positions of the workflow step markers as determined at 210. As noted above, a workflow step may generate an entry or a line in the logfile that marks the start of its logging of information to the logfile (e.g., a workflow step start marker) and may also include an entry or a line that marks the end of its logging of information to the logfile (e.g., a workflow step end marker). Accordingly, at 230, the processing device divides the logfile into sections based on the positions of these workflow start markers and end markers. Additional lines may appear between these sections corresponding to workflow steps (e.g., lines may appear between an end marker for a first workflow step and a start marker for a next workflow step in the workflow process), and these additional lines between workflow steps may also be grouped into their own sections. In various embodiments of the present disclosure, a position within a logfile may be specified based on, for example, a line number (e.g., number of newline characters between the start of the file and the position) or a number of bytes from the start of the file.

At 250, the processing device applies subtable parsers for each identified subtable in the input logfile. A given section in the logfile may include one or more subtables, or no subtables, depending on the behavior of the software program generating output for that section. As noted above, different software programs may log data to the logfile in different formats. For example, different software programs may use different identifiers for the same metric (e.g., abbreviations versus full names) or no identifiers at all (e.g., a list of values with separators such as commas, slashes, colons, or the like in between the different values). Furthermore, this data may span multiple lines, thereby making it difficult to separate this data merely on a per-line basis. Some software programs may generate a table using plain text, in which case the columns or rows of the tables may specify the label associated with the text.

Accordingly, at 250, the processing device uses multiple independent parsers to capture this subtable data. The entire logfile does not have to be re-examined in this second pass. Instead, in some embodiment, the processing device seeks (e.g., moves to) to the subtable identifier points identified during the first pass at 210 and calls the relevant parser that is specialized for parsing that subtable of data (e.g., designed for parsing the data expected to appear in such a portion of the logfile), where the parser terminates at the end of that logfile subtable data.

At 270, the processing device generates structured data representing the input logfile data based on the sections, the informational messages, and the parsed subtables. The specialized parsers extract data values (e.g., metrics output by the software programs for the different workflow stages) from the text representations in the logfile and convert these into structured semantic data in a text data format such as comma separated values (CSV), tab separated values (TSV), JavaScript Object Notation (JSON), extensible Markup Language (XML), Yet Another Markup Language (YAML), or the like, or in a binary data format (e.g., binary JSON or BSON, MessagePack, or the like) such that the data values are easily loaded for comparison and display in a user interface, as will be discussed in more detail below. In addition, the informational messages are collected for analysis as a group, as will be discussed in more detail below.

The structured data generated by the processing device at 270 may include separate structured data for each category of logfile information. In some embodiments, the structured data are stored as separate structured data files (e.g., .csv and .json files), and, in some embodiments, structured data extracted by different parsers is stored in separate files (e.g., a specialized parser for parsing quality of result metrics stores data extracted from an input logfile in a QoR_heartbeat.csv file, a specialized parser for parsing global router metrics stores data extracted from the input logfile in a global_router.csv file, and a specialized parser for parsing legalizer metrics stores data extracted from the input logfile in a legalizer.csv file) In some embodiments, the locations of the parsed subsections, the informational messages, and the parsed subtables within the original input logfile are stored in the structured data, such that the report can display or link directly to a location in the logfile that contained those metrics (see, e.g., column 486 in FIG. 4I, which shows a line number corresponding the location in the logfile that contained the corresponding metrics).

While FIG. 2 depicts a method for generating structured data from input logfiles in a batch mode or post-processing mode, such as after a run of the workflow process (e.g., EDA process) is completed and the input logfile is static, embodiments of the present disclosure are not limited thereto and also include embodiments that implement automatic incremental capture of data from logfiles as the logfiles are being generated by a computational workflow process (e.g., while an EDA workflow process such as a compiler is running). For example, in some embodiments, the logfile data is incrementally extracted at the end of each significant step in the workflow and again when the workflow shuts down.

Figure 3:
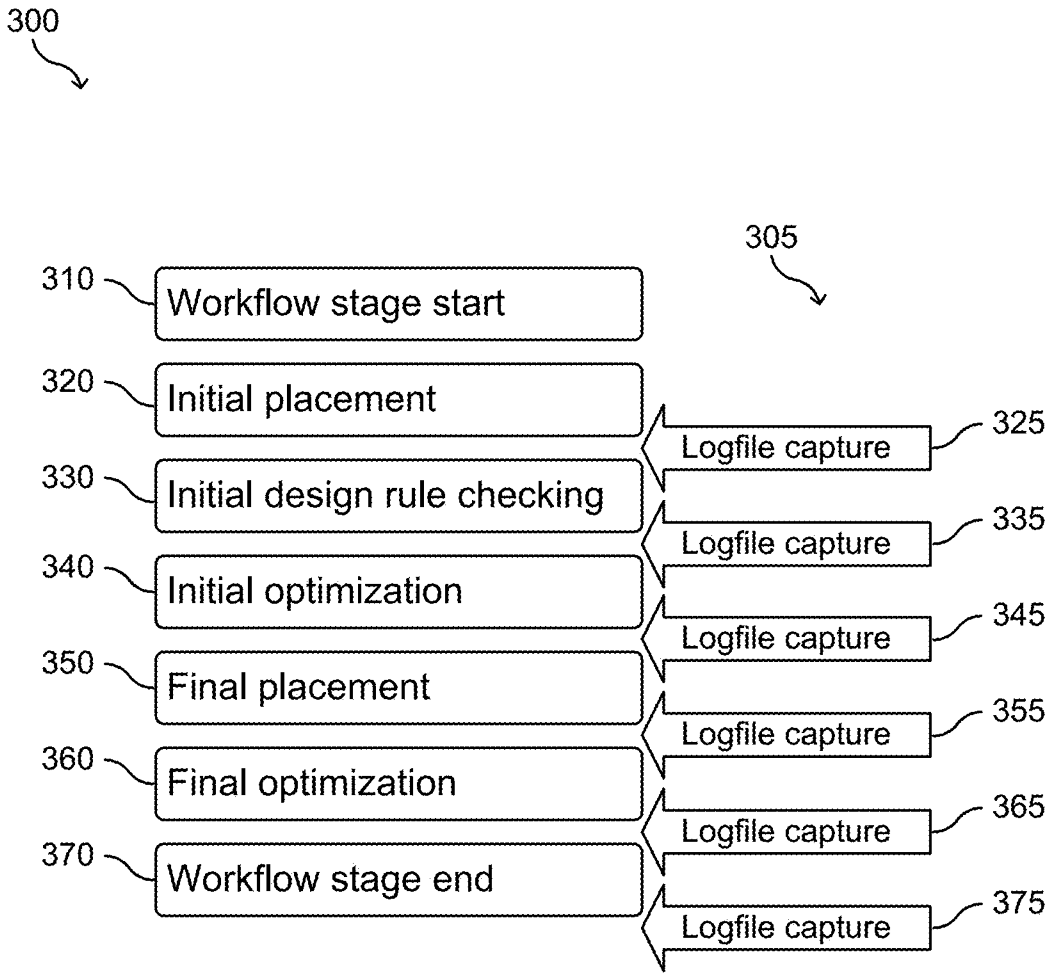
FIG. 3 is a schematic depiction of a placement workflow stage using incremental logfile capture, according to embodiments of the present disclosure.

As one non-limiting example of incremental capture of logfiles, FIG. 3 is a schematic depiction of a placement workflow stage 300 using incremental logfile capture, according to some embodiments of the present disclosure. As shown in FIG. 3, the placement workflow stage 300 starts at 310 and includes various sub-portions or steps, including initial placement 320, initial design rule checking (DRC) 330, initial optimization 340, final placement 350, and final optimization 360, in addition to a workflow stage end step 370 (e.g., which may perform additional cleanup or generate additional logging information).

An incremental logger 305 according to embodiments of the present disclosure operates concurrently with the placement workflow stage 300 and incrementally captures data from the logfile after each stage, such as at 325 between initial placement 320 and initial design rule checking (DRC) 330, at 335 between initial design rule checking (DRC) 330 and initial optimization 340, at 345 between initial optimization 340 and final placement 350, at 355 between final placement 350 and final optimization 360, at 365 after final optimization 360, and at 375 after the workflow stage end step 370. Once captured, the corresponding captured parts of the logfile can be processed immediately (e.g., using two pass method described above with respect to FIG. 2), without waiting for the remaining sub-stages or portions of the placement workflow stage 300 to complete. While FIG. 3 depicts an example where incremental capture is applied to a placement workflow stage 300 of an EDA workflow, embodiments of the present disclosure are not limited thereto, and incremental capture may be applied to other computational workflows (whether EDA related or not).

One technical advantage of incremental capture of logfiles over post-processing or batch processing of logfiles is reduced runtime for report generation. Logfiles can be large (often hundreds of megabytes, sometimes gigabytes), which can take a long time to process each of these logs (e.g., about a minute to process, even with efficient, optimized parsing). Any given run may include multiple logfiles (e.g., 6 or more logfiles), and therefore processing all of the logfiles across multiple runs can take, for example, 15 minutes to 1 hour, which can quickly add up in engineering time. By doing logfile capture incrementally during the run of the computational workflow process, this parsing runtime is masked from the user (e.g., because the computational workflow process itself has a much longer runtime than the analysis of the logs—for example, a single run of an EDA process may take hours to days). In addition, in some embodiments, the incremental logger 305 is executed as a concurrent process alongside the computational workflow process. In some embodiments, the incremental logger 305 is executed on the same computer system as the computational workflow process (e.g., the placement workflow stage 300), such as in a separate thread or operating system process and by reading from the logfiles written by the computational workflow process. In some embodiments, the incremental logger 305 is executed on a separate computer system from the computational workflow process, such as where a first computer system executing the computational workflow process writes the log data to a location that is readable by a second computer system running the incremental logger 305 (e.g., writing the log data to a shared drive of the first computer system or to a shared network drive shared by the second computer system or a third computer system, such as a network file server).

In addition, according to some embodiments of the present disclosure, incremental logging is implemented within the workflow stage (e.g., within the software program executing the stage), such as in a separate thread running on the same computer system or a separate thread running on a different computer system, and therefore can capture additional data that would not otherwise be available in logfiles, where the additional data may be specified by the incremental logger that captures data from the specific tool. In some embodiments, additional information about the execution environment of the software program is also captured and supplemented through this approach.

The result of the incremental capture process is the same collection of structured data extracted from the logfiles, as described above with respect to FIG. 2.

Referring back to FIG. 1, at 130, the processing device determines corresponding sections of the structured data from the multiple different runs of the computational workflow process. Because the multiple different runs are based on the same computational workflow process, the number, types, and order of the workflow stages are the same between different runs. Therefore, each of the heterogenous, time sequenced logfiles is expected to have sections corresponding to logs generated by the same workflow stages. Furthermore, embodiments of the present disclosure are not limited to cases where all of the runs have the same type of data in the same order for a given logfile. It is possible, for example, that there is a step run in one run that is not in others, or steps that have switched order between runs, or steps that are repeated in one run but not the other. Accordingly, at 130, the processing device determines corresponding sections of the structured data from the logfiles based on, for example, matching the process workflow markers between different logfiles and based on, for example, the relative positions of the sections in the logfiles when those corresponding sections exists, and handling cases where particular data (e.g., sections) is available in fewer than all of the logfiles (e.g., showing blanks in some portions of the report where there is no corresponding data available from that run).

Referring to FIG. 3 as an example, two different runs of the same placement workflow stage 300 are expected to generate sub-sections relating to initial placement 320, initial design rule checking (DRC) 330, initial optimization 340, final placement 350, final optimization 360, and workflow stage end 370. Because the lengths of each of these sections may differ from one run to another, the absolute positions of these sections within the different logfiles may vary, but, in some embodiments, the relative positions of these sections, relative to one another, within the logfile will be maintained, such that the processing device uses the relative ordering to determines which sections correspond between runs. In some embodiments, as noted above, not every logfile is required to include every section (e.g., sections or steps can be omitted or repeated different numbers of times in different log files or in different positions). When there is a mismatch in the relative locations of sections or the number of steps in different logfiles, then, in some embodiments, the workflow markers associated with the sections are used to identify closest matches between the different logfiles. For example, if a given step appears once in a first logfile and three times in a row (e.g., three iterations) in a second logfile, then the first appearance of the step in the first logfile may be identified as corresponding to one of the instances of the step in the second logfile (e.g., the first instance of the step in the second logfile). (As a specific example, a route optimization step in an EDA workflow may be repeated multiple times to iteratively improve the routing of nets in an integrated circuit design, where the number of repetitions may depend on the quality of the results produced after each iteration.)

At 150, the processing device extracts metrics from the corresponding sections of the structured data files. The processing device may also extract informational messages from portions of the structured data files. As noted above, these metrics may include quality of result metrics computed during periodic analyses of the current quality of the result (which may be referred to herein as quality of result heartbeat analyses) that are performed on the results between different stages or sub-stages of the computational process workflow (considering a workflow where the results are improved by each stage or sub-stage), summary metrics generated by workflow stages of the workflow, and the like.

At 170, the processing device generates a user interface to display metrics from the corresponding sections of different ones of the heterogenous, time sequenced data files, where the corresponding metrics from different runs are placed adjacent to one another, thereby making it easy for a user to compare the results of different runs. In some embodiments of the present disclosure, the user interface report displays a single logfile without comparing multiple logfiles against one another (in such embodiments, determining corresponding sections of logfiles captured from different runs at 130 may be omitted).

Figure 4A:
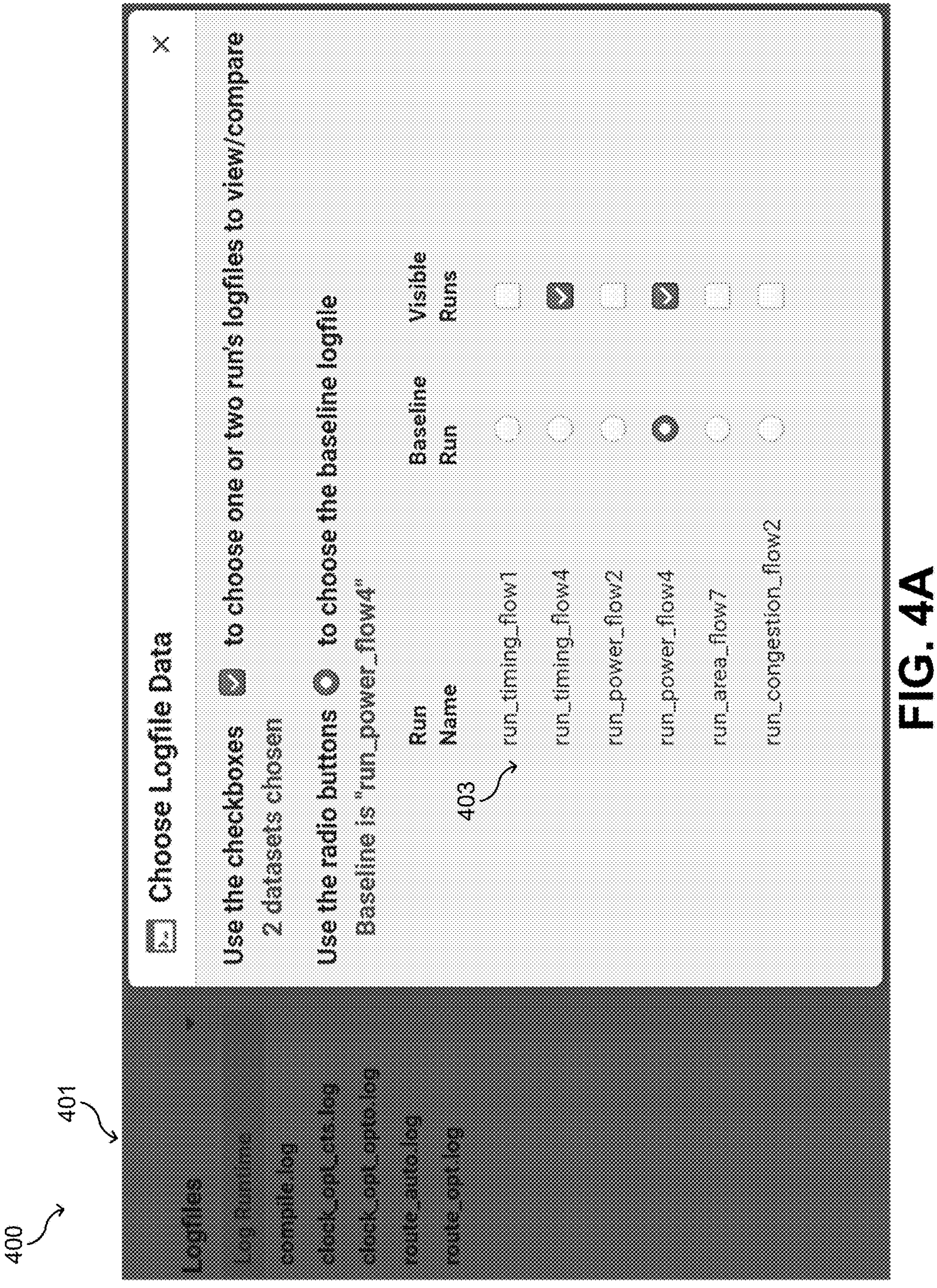
FIG. 4A is a screenshot of a portion of a user interface for selecting logfile data, according to embodiments of the present disclosure.

Some aspects of embodiments of the present disclosure relate to a streamlined access to logfile data, in which a user can merely specify a directory (folder) of logfile data one time to generate a full report. In these embodiments, the user interface provides an interface to open and access any of that logfile data with relatively few selections. FIG. 4A is a screenshot of a portion of a user interface 400 for selecting logfile data, according to one embodiment of the present disclosure. FIG. 4A shows a list of types of logfiles 401 (e.g., logfiles from different workflow stages) can be navigated on the left-hand menu, and a dialog for selecting run data 403 for viewing and comparison can be opened. FIG. 4A shows six runs of run data 403 to choose from, labeled "run_timing_flow1", "run_timing_flow4", "run_power_flow2", "run_power_flow4", "run_area_flow7", and "run_congestion_flow2". Each run corresponds to a separate (e.g., independent) execution of a computational workflow, such as an EDA process for generating a layout of an integrated circuit (e.g., a collection of masks for controlling semiconductor fabrication equipment such as photolithography machines) based on an input integrated circuit design (e.g., expressed as a netlist), where any given run may generate multiple different logfiles 401 corresponding to different workflow stages. Different runs may produce different results due to changing the settings for various parameters of the computational workflow. Because the user interface 400 shows all of the available runs on the same screen, there is no need for a user to browse through a filesystem to find the relevant log files between different runs. Instead, all of the run files that can be compared are displayed in a single screen. From the run selection dialog box, a user can select one of the runs to serve as a baseline run for comparison and select one or more additional runs as selected visible runs for comparison to the baseline run.

Figure 4B:
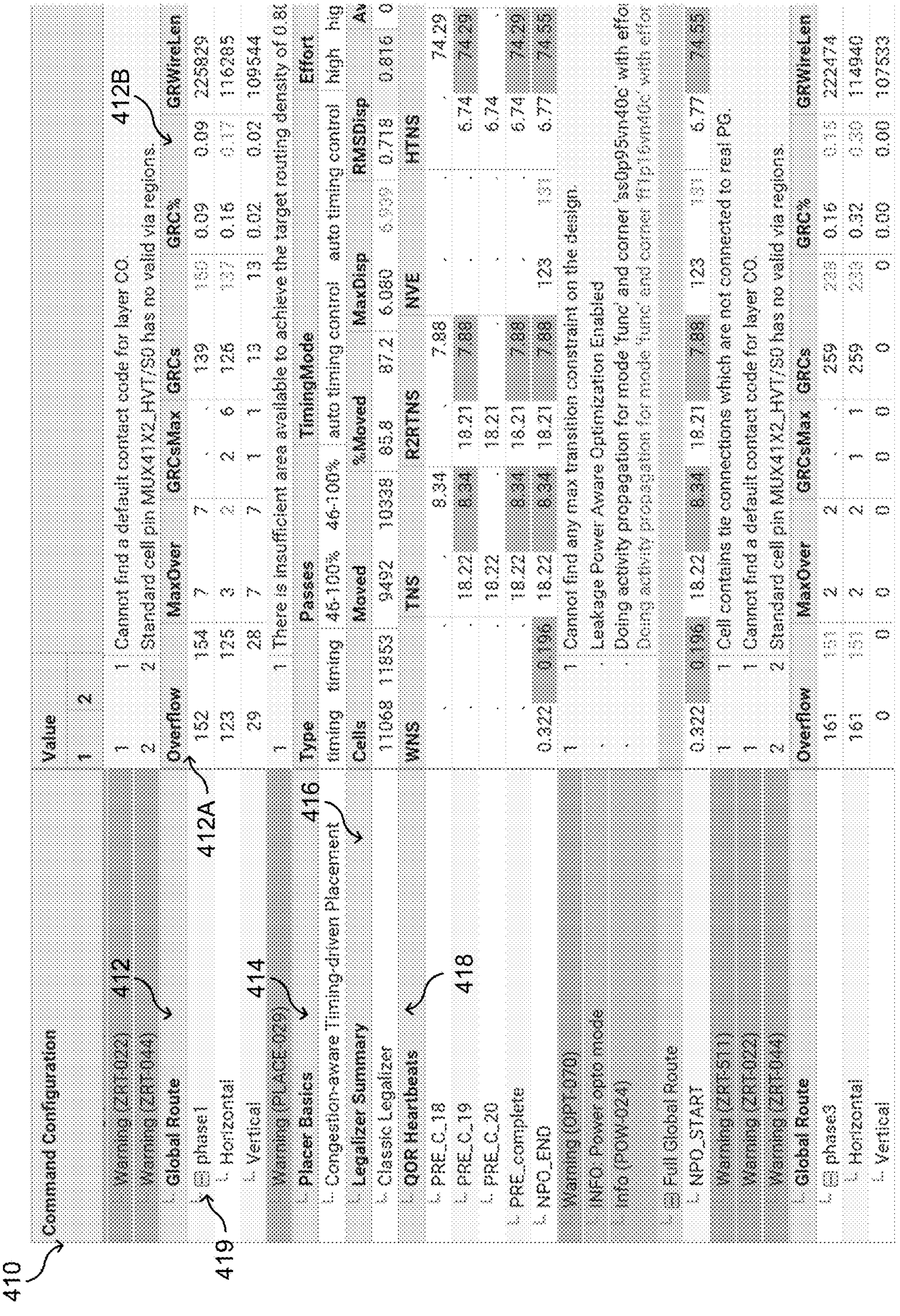
FIG. 4B is a screenshot of a portion of a user interface displaying data extracted from logfiles corresponding to two different runs, according to embodiments of the present disclosure.

FIG. 4B is a screenshot of a portion of a user interface 410 displaying a report of data extracted from logfiles corresponding to two different runs, according to one embodiment of the present disclosure. The runs that are displayed in this user interface may correspond to the runs that were selected using the user interface shown in FIG. 4A. As shown in FIG. 4B, the data from the runs are organized into sections, such as a global route section 412, a placer basics section 414, a legalizer summary section 416, and a QOR heartbeats section 418. The different sections shown in the report provide a hierarchical representation or outline of the logged data collected during the steps or stages in runs of the process flow, as each step has an identified start and end point in the log file. Metrics from different runs are displayed in adjacent columns, and different metrics within the same section are shown in different parts of the report in the user interface 410.

For example, in the global route section 412, a first set of metrics relates to overflow counts 412A (a routing congestion metric where routing demand for nets through a local region exceeds the supply of tracks available for nets to be placed) for both directions, horizontal and vertical, where a first run had 152 overflow in both directions, and a second run had 154 overflow in both directions. The global route section 412 also shows another set of metrics labeled GRC % 412B, along with the values extracted from the logfiles for the two runs. The hierarchical structure of the report allows metrics from different sections or subsections of the report to be selectively hidden or shown, such as by selecting a control 419 shown in FIG. 4B to collapse or expand a group of metrics.

Aspects of embodiments of the present disclosure enable easy comparisons of the logfiles between any two runs of data loaded into the report. Comparisons help users to draw conclusions about run results, because many quality of result metrics in the design of integrated circuits, such as power and area, do not have a specific target-instead, engineers seek to obtain as good a result as possible without degrading other key metrics. Looking at the results of two runs against each other provides the user with this kind of information. Some aspects of embodiments of the present disclosure relate to providing visual markup to highlight significant shifts in metrics. For example, green may be used to highlight improvements with respect to a baseline while red may be used to indicate a degradation. In addition, different degrees of shading may indicate the degree of change—dark red or green indicates a large change, and lighter shades indicate smaller changes. This shading draws the user's attention towards important shifts in quality of result metrics, where the degree of importance is indicated by the degree of shading. As discussed in more detail below, in some embodiments, insignificant differences are deemphasized in the report. Therefore, users do not need to search for corresponding numbers in different logfiles to see if there may be important differences. In the example shown in FIG. 4B, values from the baseline run are shown in the left columns of metrics and the values from the comparison run are shown in the right columns. In the column for the worst negative slack (WNS) metric in the QOR heartbeats section 418, the comparison run has significantly improved WNS (0.196 versus the baseline 0.322), and therefore the values in the comparison run are highlighted.

FIG. 4C is a screenshot of a portion of a user interface 420 displaying a portion of a report of data extracted from logfiles corresponding to numeric metrics representing the quality of the output from two different runs, according to one embodiment of the present disclosure. Values from the baseline run are shown in the left columns of metrics and the values from the comparison run are shown in the right columns. In the column for the worst negative slack (WNS) metric 421, the comparison run has significantly improved WNS (0.329 versus the baseline 0.879), and therefore the value in the comparison run is highlighted (e.g., with diagonal lines in the background). However, in the leakage metric 423, the comparison run has a mixture where some values have significantly better leakage than the baseline (for the NPO_START and PRE_C_4 rows, showing leakage of 159.76 versus a baseline of 160.87) while other values have significantly worse leakage (161.48 versus the baseline 159.45) and therefore the difference is highlighted using different shading (e.g., with a dot pattern in the background).

In some embodiments, metrics that exhibit relatively insignificant differences are deemphasized in the user interface for the report. Referring still to FIG. 4C, in the first few rows (NPO_START, PRE_C_4, PRE_C_6, PRE_C_7_[28], and PRE_C_8_[14]) the total negative slack (TNS) metric 425 differs between the baseline (18.57) and the comparison run (17.83 or 16.95 in various rows). Because this difference is considered to be insignificant, in the example shown in FIG. 4C, the column of metrics corresponding to the comparison run (the right side column) is greyed out to deemphasize those values in the TNS metric 425 and the run-to-run TNS (R2RTNS) metric 427. On the other hand, the last few rows (PRE_C_9, PRE_C_10, PRE_C_11, and PRE_C_12_[4]) show significant improvement in TNS (baseline of 18.21 versus comparison run 7.67). This deemphasizing of metrics is used to mask false positives from being reported. In an approach where shading is used to indicate improvement or degradation, false positive results can occur. For example, looking at WNS (worst negative slack) timing, one run may have 1 picosecond of negative slack (a small amount), and another run may have 3 picoseconds of negative slack (another small amount). Naïve shading based on percentage change of this value would show that the second run degraded results by 300% and would be flagged as a large violation. To address this, aspects of embodiments of the present disclosure mask this as a small change and do not highlight it. This further helps ensure that the different colored (e.g., red and green) visual markup is meaningful and is only highlighting important differences. Determining whether a difference is a small amount or a significant amount, as well as determining the degrees of any differences are specific to the characteristics of the metrics (e.g., distributions of values for those metrics). Accordingly, when rendering the user interface, different calculations and different thresholds may be applied to different metrics.

Some aspects of embodiments of the present disclosure further relate to highlighting differences in non-numerical data (or textual data) appearing in the logfiles. Some of this data can communicate information about software program configuration or results of running workflow steps or commands. To emphasize these important changes, shading may be used in the report to highlight these non-numerical (or textual) differences. FIG. 4D is a screenshot of a portion 430 of a report highlighting differences in non-numerical data, according to one embodiment of the present disclosure. In the example shown in FIG. 4D, in a baseline run, a workflow stage corresponding to a placer (e.g., a software program for placing circuit portions in an integrated circuit design) may be configured to use an auto timing control feature 431 for timing-driven placement, but a comparative test run may have the placer configured to use a worst negative slack (WNS)-driven approach 433 instead. In some circumstances, software programs may automatically choose a configuration setting (e.g., timing-driven versus WNS-driven placement) based on conditions of the input (e.g., detecting conditions that suggest that one configuration setting would lead to better results than the other). Spotting differences such as these is extremely difficult to do in a plaintext logfile comparison, as this configuration setting may appear in a single line buried among tens of thousands of other lines of the logfile relating to the run of the placer workflow stage. Nevertheless, such a difference in configuration can have a major impact on quality of result metrics between runs, and emphasizing this difference, as shown in the darker background of the WNS-driven setting 433 in the comparison run, can help an engineer to understand the reason for the difference in timing metrics.

In addition to showing the data values extracted from the logfiles as shown in the example of FIG. 4B, some aspects of embodiments of the present disclosure relate to automatically displaying comparisons of values from different runs based on percentage change and based on absolute change. FIG. 4E is a screenshot of a portion 440 of a user interface showing three different modes or different formats for displaying comparisons of numeric metrics representing the quality of the output from two different runs, according to one embodiment of the present disclosure.

In a raw values mode 441 (or raw values format), the report displays the raw values of quality of result heartbeat metrics including total negative slack (TNS), register-to-register TNS (R2RTNS), and leakage that were extracted from the logfiles. For example, for the PRE_C_8_[14] step, the baseline leakage was 159.45 and the comparison leakage was 164.18.

In the percent delta from baseline mode 443 (or percent delta format), the report displays a percentage change from the raw value from the baseline run (the left column) to the comparison run (the right column). For example, the leakage value of 164.18 in the comparison run is 3.0% higher than the baseline value of 159.45, and therefore the user interface displays a value of 3.0% for the comparison run.

In the absolute delta from baseline mode 445 (or absolute delta format), the report displays a value difference between the baseline value and the comparison run. For example, the leakage value of 164.18 in the comparison run is 4.73 higher than the baseline value of 159.45, and therefore the user interface displays a value of +4.73 for the comparison run.

Automatically calculating these comparisons saves users the effort of performing mental math or copying and pasting values into separate calculators (e.g., handheld calculators or calculator applications running on a computer system), which reduces errors and allows comparisons to be made across the report, rather than based on a single metric at a time.

Some aspects of embodiments of the present disclosure relate to a technique for switching between the different modes of display of the metrics or different display formats for the metrics. When an interactive report according to embodiments of the present disclosure is displayed using a web browser or using an application that is built on a web technology framework (e.g., using an integrated web browser rendering engine), the report may be represented using hypertext markup language (HTML), styled with cascading stylesheets (CSS), and where some additional interactivity may be provided by a scripting language such as JavaScript. Changing between the display modes, e.g., between values, percent delta from baseline, and absolute delta from baseline, involves replacing the values displayed in the HTML. One approach to changing these values would be to use a JavaScript function that is triggered when the user scrolls and updates the contents of newly rendered cells with the correct data (e.g., rendering the cells with the raw value, percent change, or absolute change). However, some browser engines may have poor performance, and running such a JavaScript function on thousands of cells in the report can cause poor performance.

Accordingly, some aspects of embodiments of the present disclosure relate to storing all possible contents within the cells of the table and using CSS to selectively show only the correct contents for the currently enabled mode, while using CSS to hide the other content.

For example, a given cell of the table (e.g., the cell for the leakage value of the comparison run in the PRE_C_8_[14] step shown in FIG. 4E) may be represented using the following snippet of HTML:

```
<div>
  <div class="value"> 164.18</div>
  <div class="pctDiff"> 3.0%</div>
  <div class="absDiff"> +4.73</div>
</div>
```

As such, all three contents (value, percentage difference, and absolute difference) are stored in the node associated with that location in the report.

To show and hide different values, the CSS stylesheet for the web page displaying the report is updated. For example, when the user enables a mode where the values are displayed (as in 441 of FIG. 4E), the computer system sets a portion of the CSS stylesheet as follows:

```
.value {
  display: visible;
}
.pctDiff {
  display: none;
}
.absDiff {
  display: none;
}
```

When the user enables a mode where the percent delta from baseline is shown (as in 443 of FIG. 4E), the computer system sets a portion of the CSS stylesheet as follows:

```
.value {
  display: none;
}
.pctDiff {
  display: visible;
}
.absDiff {
  display: none;
}
```

When the user enables a mode where the absolute delta from baseline is shown (as in 445 of FIG. 4E), the computer system sets a portion of the CSS stylesheet as follows:

```
.value {
  display: none;
}
.pctDiff {
  display: none;
}
.absDiff {
  display: visible;
}
```

This updates the styling for all table cells and avoids calling a JavaScript function to operate separately on thousands of cells of the table, thereby improving user interface rendering performance for large tables (e.g., reducing or avoiding jerky scrolling or slow changes to the display mode of the content shown in the user interface).

Some aspects of embodiments of the present disclosure relate to switching between different runs as baseline runs for comparison. For example, when initially comparing how a second run compares to a first run, then switching to review the results of a third run, it may be more useful to use the second run as a baseline rather than the first run as a baseline. As shown in the example user interface of FIG. 4A, described above, a list of different run data 403 is shown, where a radio button allows selection of exactly one of these runs as a baseline run. By accessing this portion of the user interface, a user can select a different run as the baseline run, while keeping the visible runs the same or different, and the user interface displaying the report will automatically update to use the newly selected baseline run as a baseline for comparison (e.g., appearing in the leftmost column of values).

As discussed above, the positions of the start and end of stages (workflow steps) are determined during the parsing process. In addition, each stage or step of the workflow may have sub-stages or sub-steps enclosed or nested therein, such that the stages, sub-stages, sub-sub-stages, and so on of the workflow process have a hierarchical relationship. Representing the logged data from runs of the workflow in a hierarchical report, such as that shown in FIG. 4B, provides a better understanding of the structure of the workflow and the relationships between the steps. In addition, as noted above with respect to control 419 shown in FIG. 4B, sections of the hierarchy can be expanded or collapsed to allow the user to focus on portions of the report that are most relevant to performing some specific analysis of the run.

Figure 4F:
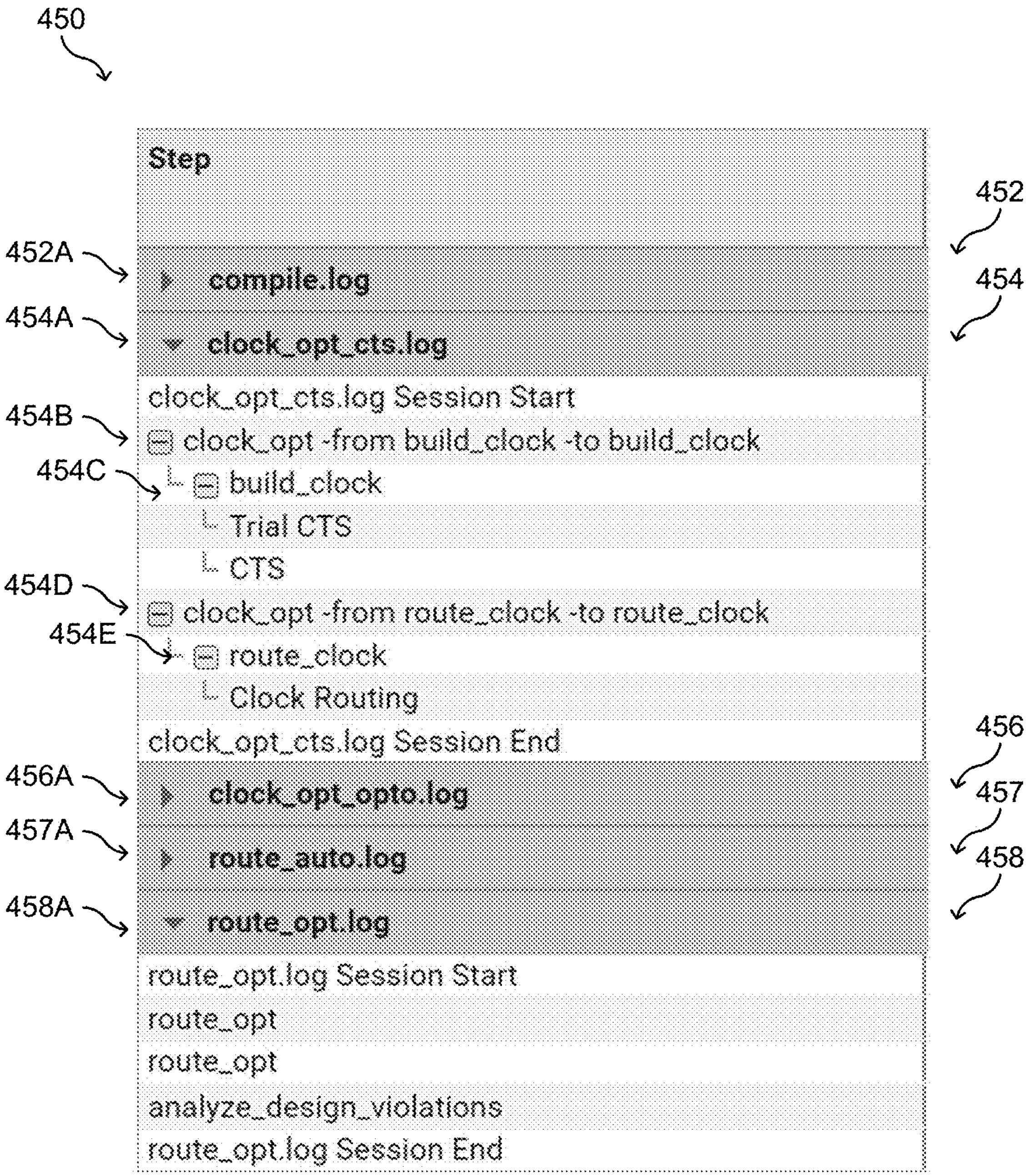
FIG. 4F is a screenshot of a portion of a user interface for a report showing different stages and sub-stages of a workflow organized into a hierarchy, according to one embodiment of the present disclosure.

FIG. 4F is a screenshot of a portion 450 of a user interface for a report showing different stages and sub-stages of a workflow organized into a hierarchy, according to one embodiment of the present disclosure. In the example shown in FIG. 4F, the report includes data from a compile stage 452 (compile.log), a clock optimization and clock tree synthesis stage 454 (clock_opt_cts.log), a clock optimization stage 456, a routing stage 457, and a route optimization stage 458, where these sections can be expanded (and made visible) or collapsed (and hidden) by using controls 452A, 454A, 456A, 457A, and 458A, respectively. In a full user interface for the report, data for corresponding stages may be displayed to the right of the portion 450 shown in FIG. 4F, in a manner similar to the portion of the user interface shown in FIG. 4B. The portions of the report for the clock optimization and clock tree synthesis stage 454 and the route optimization stage 458 are expanded and visible, while the portions of the report for the compile stage 452, the clock optimization stage 456, and the routing stage 457 are hidden. Stages may include sub-stages (and sub-sub-stages and so on, in a tree structure or hierarchy) that can also be expanded or collapsed (if they have child stages) using corresponding controls, such as controls 454B, 454C, 454D, and 454E.

FIG. 4G includes screenshots of a portion of a user interface showing summary metrics and expanded detailed metrics, according to one embodiment of the present disclosure. In the example described and shown above with respect to FIG. 4B, some of the metrics shown in the report, such as the global route overflow metrics, are computed as summaries of detailed logging output. For example, the routing metrics may relate to all metal layers in an integrated circuit design. A summary table 460 shown in FIG. 4G shows summarized global routing metrics in both directions as well as separate metrics for horizontal and vertical directions. This summary information reduces the amount of visual space consumed by the global route subtable in the user interface. However, in some circumstances, a user may want more detailed or verbose information at the level of detail at which the metrics appeared in the logfiles. For example, the user may be interested in which metal layers had the largest numbers of congestion events. Accordingly, some aspects of embodiments of the present disclosure relate to providing a user interface control (e.g., a toggle button, a dropdown menu, a pulldown menu, or a multi-select interface such as checkboxes) such that a user can expand summarized data into verbose data, such as in a verbose table 461 shown in FIG. 4G. The verbose table 461 includes separate rows for each metal layer in the integrated circuit design (e.g., M2 through M13), and in some embodiments, the user interface provides a separate control for each row such that the user can toggle the visibility of any given row. In some embodiments, the verbose table 461 shows the raw values extracted from the logfiles. As such, a report provides both a high-level view of the logfiles and provides functionality for a user to perform a deeper analysis of the details, without having to open and search through the original plain text logfiles.

Logfiles can contain informational (info), warning, and error messages that were printed by commands or software programs during different stages of the workflow. In some instances, these messages constitute 50% or more of the total logfile and frequently overwhelm users attempting to read logfiles manually. For example, when the workflow is for generating a design of an integrated circuit, a logfile may include 1,000 lines of warnings one after the other, where the warnings are all the same, but concerning different nets or cells in the IC design. In some circumstances, rather than read every message in the logfile, it is more useful for an engineer to understand a summary. Accordingly, in some embodiments of the present disclosure, the processing device collapses a plurality of repetitive messages into a summary of those repetitive messages. In some embodiments, determining whether two messages are variants of the same message or different messages is performed during the parsing of the messages generated by a stage of the computational workflow, where different stages generate different types of output messages, and where a customized parser for the stage parses the messages into different message types (e.g., warnings regarding potential timing violations versus warnings about potential power violations). Accordingly, in some embodiments, the processing device summarizes messages of the same type that are generated during a given stage, where the summary shown in the report shows, for example: that a given message exists, where in the logfile it occurs (e.g., during which stage or sub-stage command or engine call), a representative example of that message, how many times the message appeared in the logfile (e.g., the number of messages in the group of messages having a same message type), and how the message differs between two logfiles.

Figure 4H:
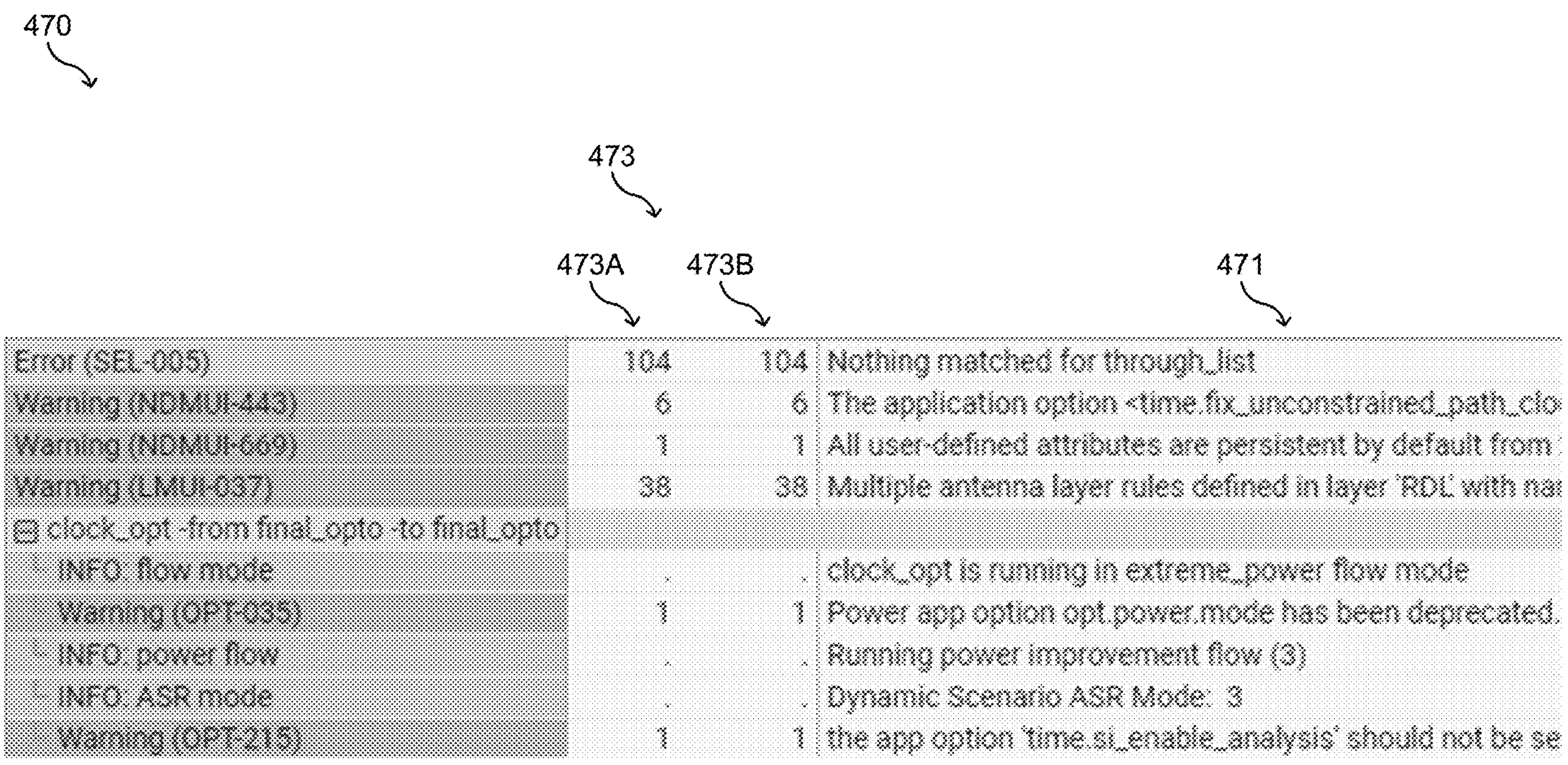
FIG. 4H is an example of a portion of a user interface showing messages generated by different commands or software programs during different sub-stages of a workflow, according to one embodiment of the present disclosure.

FIG. 4H is an example of a portion 470 of a user interface showing messages generated by different commands or software programs during different sub-stages of a workflow, according to one embodiment of the present disclosure. In the example shown in FIG. 4H, messages are shaded (or color-coded) by severity (e.g., in a color interface, red for error, orange for warning, blue for info). For each section of the logfile, one representative example 471 of the message is captured and displayed, as well as a count 473 for the total number of times the message occurs in that section of the logfile for each run (e.g., a count for the baseline run 473A and a count for a comparison run 473B).

In some embodiments, significant changes in message count are highlighted in a manner similar to that for other metrics as described above with respect to FIG. 4B and FIG. 4C. In some embodiments, a significant change includes a message appearing zero times in one run, but a non-zero number of times in another run, or when a message appears in both runs but has a large change in message count. For example, a warning occurring five times in one run but a thousand times in another may be a significant change that is highlighted. The threshold for determining significance of difference may be based on a function (e.g., determining that the change in message count is at least one order of magnitude different). In some embodiments, the threshold for whether a change is significant is determined based on the type of warning message.

Some aspects of embodiments of the present disclosure relate to determining whether a message body has changed between runs. The specific portions of the messages that represent significant differences are specific to the content of the logfiles shown in the report. For example, in the case of logfiles from an EDA process for an integrated circuit design, when considering a warning about a particular net, a change in the name of the net between runs may be insignificant because that net name is almost certain to have changed in two runs. On the other hand, another message that indicates whether an optimization is being performed in a timing mode or a total power mode may be significant because it will affect the entire flow trajectory and behavior of the optimization stage. Accordingly, some aspects of embodiments of the present disclosure relate to providing an interface for defining customized rules for specifying how to compare messages to determine whether differences are significant (and therefore should be highlighted) or insignificant (and therefore should be deemphasized).

In some embodiments, when detecting a significant change in a message, the report highlights the message and may show both a representative message (e.g., from the baseline run) and another message (e.g., from a comparison run) that is determined by the customized rule to be significantly different.

Some aspects of embodiments of the present disclosure relate to a user interface for displaying these messages when comparing logfiles. Logfiles contain many types of messages, and even in a summary view of the report as shown in FIG. 4B and FIG. 4H there can be a lot to review. To address this, some aspects of embodiments of the present disclosure relate to suppressing the display of all the messages that appear the same between two runs (e.g., between the baseline run and the comparison run). As such, when operating in this mode, the report only shows the messages whose counts have dramatically changed, messages that appear in one logfile but not in the other, and informational message whose body has changed in an important way. With this view, in some circumstances, 95% or more of the messages will be hidden away (and can be turned on by changing a setting), so the user can focus on the messages that are different between runs.

Some aspects of embodiments of the present disclosure relate to the display of subtables of data. As noted above with respect to the parsing of subtables of data, different stages and sub-stages or commands of the workflow process may log metrics to logfiles with different types of data. Displaying logfile data is challenging because there are many different types of metric data to be displayed corresponding to different subtables (e.g., outputs of different stages of the workflow process, such as, in the case of an EDA process, coarse placer, legalizer, optimization, global/track/detailed routing, high-fanout synthesis, clock tree synthesis, CCD (useful skewing), multibit, and the like). Generally, displaying this data in tables is convenient for associating metrics with given stages or substages and for performing comparisons of the metrics between runs. However, merging different tables having different types of data presents formatting challenges.

Accordingly, aspects of embodiments of the present disclosure relate to using different formatting for each subtable shown in the report based on its contents. The formatting customizations for a given subtable may include number of columns, columns headers/titles, column widths, and styling choices (how cells are colored based on differences in values, how values are aligned, whether values are wrapped if the column is too narrow, and the like). These subtables are displayed in chronological sequence based on the order of their appearances in the logfiles. In some cases, subtables may be nested within other subtables (e.g., where a subcommand or sub-stage is run within a stage).

Figure 4I:
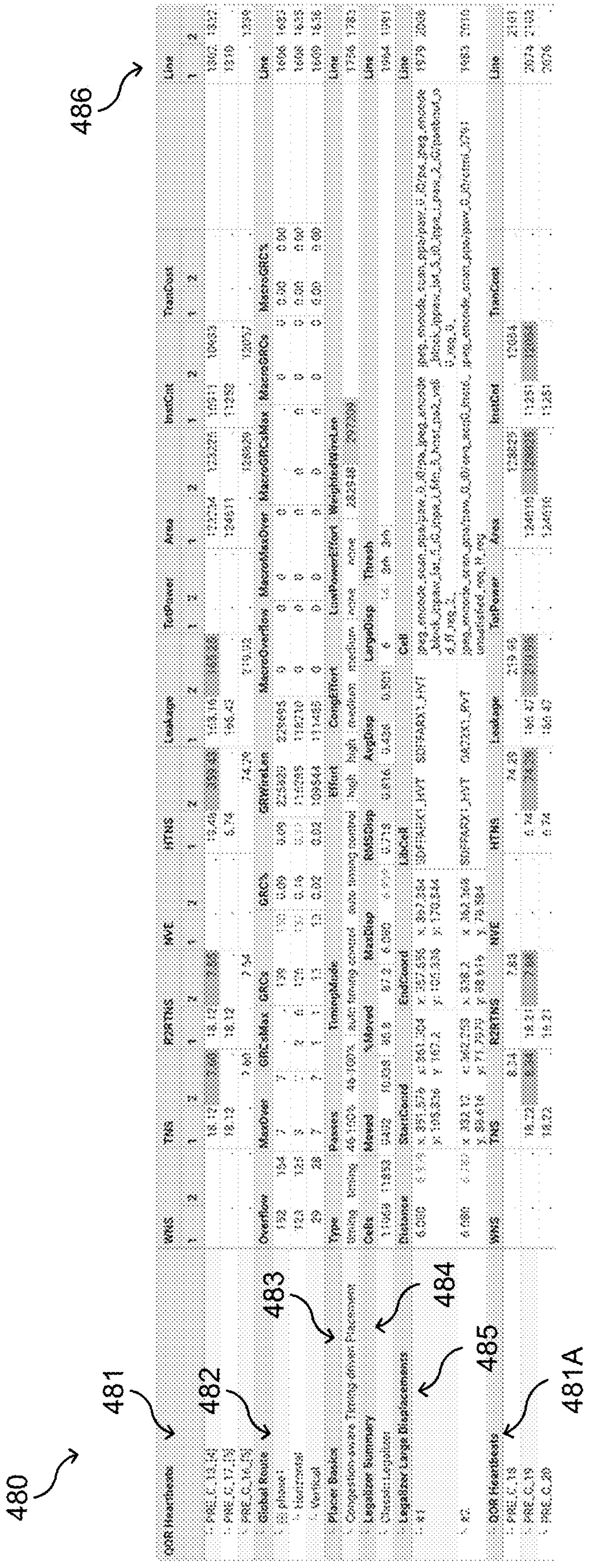
FIG. 4I depicts a portion of a user interface depicting a portion of a report with multiple subtables, according to one embodiment of the present disclosure.

FIG. 4I depicts a portion 480 of a user interface depicting a portion of a report with multiple subtables, according to one embodiment of the present disclosure. The example shown in FIG. 4I includes five different subtables: QOR heartbeats 481, global route 482, placer basics 483, legalizer summary 484, and legalizer large displacements 485. Each of these subtables is shown in chronological order based on their data's appearance in the logfile. The QOR heartbeats subtable 481 is split up by the other subtables and continues after the legalizer large displacements subtable 485 as QOR heartbeats table 481A. Each subtable has significantly different formatting requirements. For example, QOR heartbeats 481 is all numeric data that is displayed in tight compact columns (e.g., worst negative slack (WNS), total negative slack (TNS), run to run total negative slack (R2RTNS), hold total negative slack (HTNS), and leakage as shown in FIG. 4I). In contrast, the placer basics subtable 483 and the legalizer large displacements subtable 485 both include a lot of text rather than numeric data that should be left-aligned and may use coloring to highlight differences such as in the change in timing mode from "auto timing control" to "WNS driven" as highlighted by the shading. The legalizer large displacements subtable 485 has fields that include cell names which are very long, and therefore may be configured to be shown in wider columns that can wrap onto multiple lines. Some subtables can share common columns that have the same formatting (coloring, column width, alignment, etc.). The example shown in FIG. 4I includes a "Line" column 486 which shows the line number from the logfile where the data came from. This is information common to all subtables, because they all include data derived from the logfile. Accordingly, some aspects of the present disclosure further relate to additionally including columns of data that are commonly formatted across different subtables, despite the different formatting of each subtable.

Accordingly, the portion of the user interface shown in FIG. 4I presents different types of data from a same logfile (e.g., different sections of a logfile from a baseline run) adjacent to corresponding data from another logfile (e.g., corresponding different sections of a logfile from a comparison run) in chronological order. This enables users to make connection between the behavior of the workflow process during these different runs. Furthermore, in some circumstances, some runs may include stages or steps that are omitted from other runs. In such cases, a row may be populated with only data from the runs that contain that stage or step, while the columns for runs that omit that stage or step are blank. This provides a user with information about workflow differences between the runs (differences in the stages or steps that are executed), where those differences may impact the final results of those runs.

For example, the results produced during one stage of a workflow has an impact on the next stage of the workflow. Embodiments of the present disclosure provide a concise and well-formatted summary of what was done during each workflow stage in a single report in chronological order, thereby making it much easier for a user to understand the full arc of how the workflow process generated its results. For example, in the case of an EDA workflow, a timing QOR degradation at one stage can be traced back to an increase in routing congestion in an earlier stage, which can be narrowed down to a particular category of routing violation, that was caused by increased layer promotion done in another workflow stage earlier in the flow. Performing this sort of root cause analysis from plaintext logfiles is a time-consuming and detailed task that only the most expert users can do. Embodiments of the present disclosure relate to automatically extracting data from the logfiles and presenting the data in a manner that highlights these salient differences in the data from the logfiles, thereby making it possible for even new users (e.g., new engineers) to analyze the results of runs of the workflow process, and significantly increases the productivity of expert engineers, who will not need to manually search the text of logfiles to investigate those differences between the runs.

In some circumstances there may be a large number of rows in a given subtable, such that not all of the rows can be displayed at the same time within a viewport or portion of the user interface on the computer display. In such cases, scrolling down through the rows may hide the header row if that header row was kept above the first row of its corresponding subtable. This may make it difficult for the user to remember what type of data is shown in each column of the subtable.

Accordingly, some aspects of embodiments of the present disclosure relate to a dynamic approach to maintaining the display of header rows for subtables. In some embodiments, the processing device detects the current scroll position in the report and the visibility state of subtables of the report and ensures that the relevant headers for all visible subtables are also visible by maintaining the display of those relevant headers.

Figure 4J:
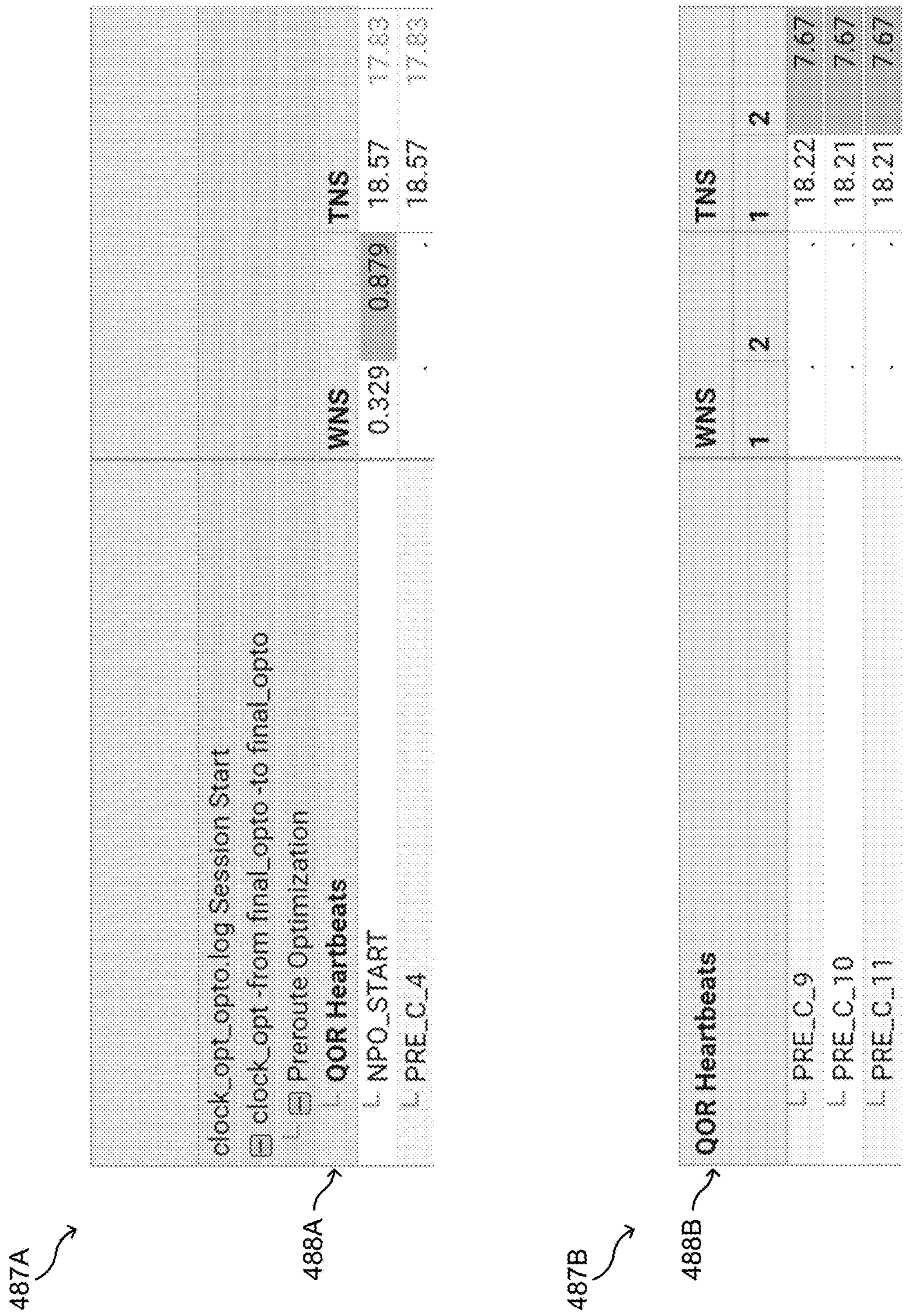
FIG. 4J shows the display of subtable headers in an example of a portion of a user interface of a subtable before scrolling and after scrolling, according to one embodiment of the present disclosure.

FIG. 4J shows the display of subtable headers in an example of a portion of a user interface of a subtable before scrolling 487A and after scrolling 487B, according to one embodiment of the present disclosure. As shown in FIG. 4J, before the table is scrolled at 487A, a header 488A can be seen in the table, just above the two first rows corresponding to NPO_START and PRE_C_4. After scrolling, such that later rows of the subtable PRE_C_9, PRE_C_10, and PRE_C_11 are shown, the user interface maintains the display of the header 488B in the user interface (e.g., by pinning the header 488B to the top bar to appear at the top of the displayed subtable).

Figure 4K:
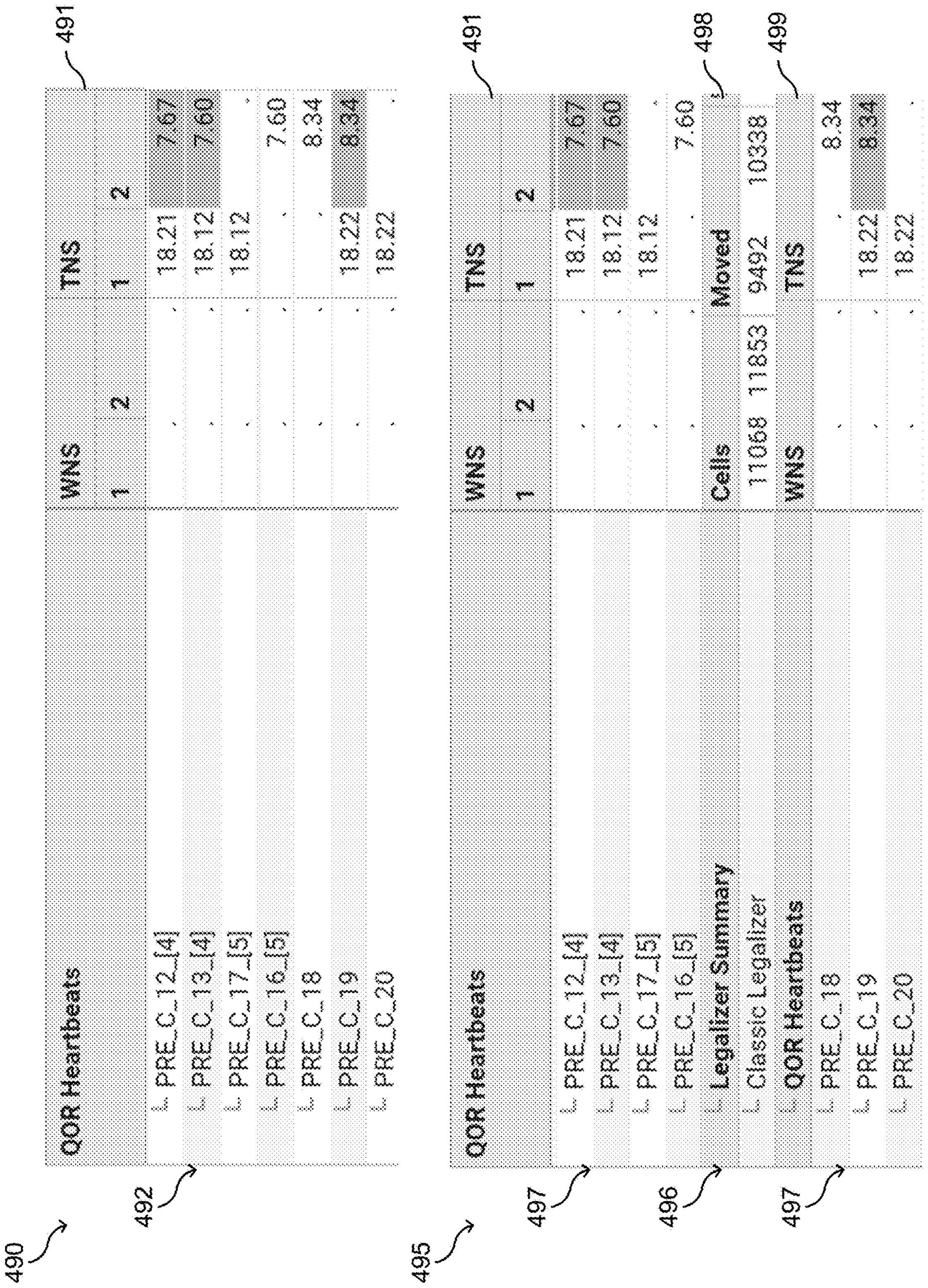
FIG. 4K shows another example showing the maintaining of the display of header rows of subtables that is split by another subtable, according to one embodiment of the present disclosure.

FIG. 4K shows another example showing the maintaining of the display of header rows of subtables that is split by another subtable, according to one embodiment of the present disclosure. Initially, the user interface 490 has a header 491 corresponding to the displayed QOR heartbeats metrics (e.g., the WNS column and the TNS column) of the QOR heartbeats subtable 492. In user interface 495, the user has turned on visibility of the legalizer summary table 496 (e.g., as discussed above, by toggling a visibility switch or expanding a step that includes metrics in accordance with a legalizer summary subtable), which splits the QOR heartbeats table 497 (the legalizer summary subtable 496 appears between the rows for PRE_C_16_[5] and PRE_C_18 of the QOR heartbeats subtable). The header for the QOR heartbeats 491 subtable still appears at the top, and a new header 498 is inserted in the user interface for the legalizer summary table 496. Another header 499 for the QOR heartbeats subtable is dynamically inserted after the legalizer summary subtable 496, because part of the QOR heartbeats subtable appears after the legalizer summary subtable 496 (starting with the row for PRE_C_18). In addition, when a nested or child subtable is hidden by some mechanism (e.g., toggling of visibility of that subtables or the rows therein), the second header for the still visible table is now hidden, as this second header becomes redundant since it is no longer split by a second subtable.

In some case, a subtable may have many different metrics and therefore may have more columns than will fit in the user interface, even when the report is displayed on a high-resolution widescreen display. In addition, a user may prefer to reduce the size of window displaying the report in order to have other programs visible on screen. Furthermore, the large number of columns may make it difficult for a user to understand the relationships between different metrics because of the amount of horizontal scrolling needed to look at the different metrics.

Figure 4L:
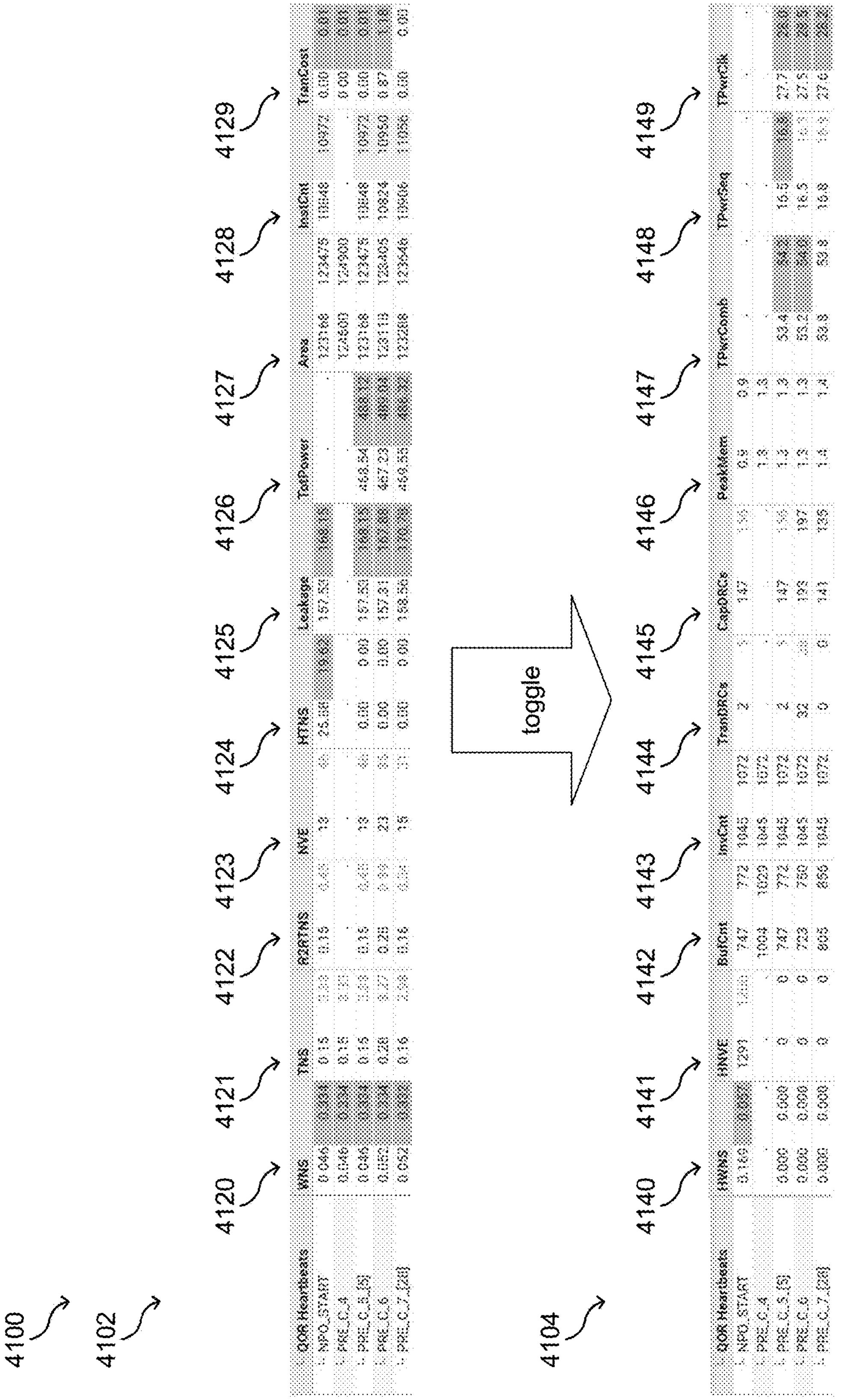
FIG. 4L depicts the display of a subtable of a report when displaying a first subtable of primary metrics of the subtable and a second subtable of secondary metrics of the subtable, according to one embodiment of the present disclosure.

Accordingly, some aspects of embodiments of the present disclosure relate to categorizing metrics of subtables into primary metrics and secondary metrics. FIG. 4L depicts the display of a subtable 4100 of a report when displaying a first subtable portion 4102 of primary metrics of the subtable and a second subtable portion 4104 of secondary metrics of the subtable, according to one embodiment of the present disclosure. In some embodiments, primary metrics correspond to frequently used metrics and secondary metrics are metrics that are rarely used. Which metrics are primary metrics and which metrics are secondary metrics may be defined by, for example, the user, by developers of the software tools that produce the log data, or by managers of the report generating software according to embodiments of the present disclosure. In some embodiments, the splitting of metrics into primary metrics and secondary metrics is performed based on criteria other than usage, such as category (e.g., in the context of EDA the categories may be timing, power, area, etc.) The subtable is split into a first subtable portion of primary metrics and a second subtable portion of secondary metrics, where the second subtable may be hidden by default, but toggled to switch with the first subtable. Furthermore, the metrics may be divided into more than two groups of metrics (e.g., primary, secondary, tertiary, and quaternary metrics) shown in more than two subtable portions (e.g., first, second, third, and fourth subtable portions). This reduces the amount of horizontal scrolling that is done by the user and allows the user to focus on the metrics that are mostly likely to be relevant to the analysis.

In the example shown in FIG. 4L, the first subtable portion 4102 of the QOR heartbeats subtable displays primary metrics that include worst negative slack (WNS) 4120, total negative slack (TNS) 4121, register-to-register TNS (R2RTNS) 4122, number of violating endpoints (NVE) 4123, hold total negative slack (HTNS) 4124, leakage power (leakage) 4125, total power (TotPower) 4126, area 4127, instance count (InstCnt) 4128, and transition cost (TranCost) 4129. A user interface component such as a toggle or switch or button, a keyboard shortcut (e.g., key combination or function key), or mouse click or gesture (e.g., middle mouse click) causes the subtable 4100 to switch from displaying the first subtable portion 4102 with the primary metrics to display the second subtable portion 4104 with the secondary metrics. In the example shown in FIG. 4L, the secondary metrics displayed in the second subtable portion 4104 include hold worst negative slack (HWNS) 4140, hold number of violating endpoints (HNVE) 4141, buffer count (BufCnt) 4142, inverter count (InvCnt) 4143, transition design rule check violations (TranDRCs) 4144, capacitance design rule check violations (CapDRCs) 4145, peak memory (PeakMem) 4146, total combinational circuit power consumption (TPwrComb) 4147, total sequential circuit power consumption (TPwrSeq) 4148, total clock circuit power consumption (TPwrClk) 4149. In some embodiments of the present disclosure, toggling between showing different subtable portions of the full subtable (e.g., toggling between the first subtable portion 4102 and the second subtable portion 4104), the approximate widths of the columns are maintained. For example, the column of the first subtable portion 4102 showing the area metric 4127 is approximately the same width and in the same location as the column showing the total combinational circuit power consumption (TPwrComb) 4147 metric of the second subtable portion 4104.

Figure 5:
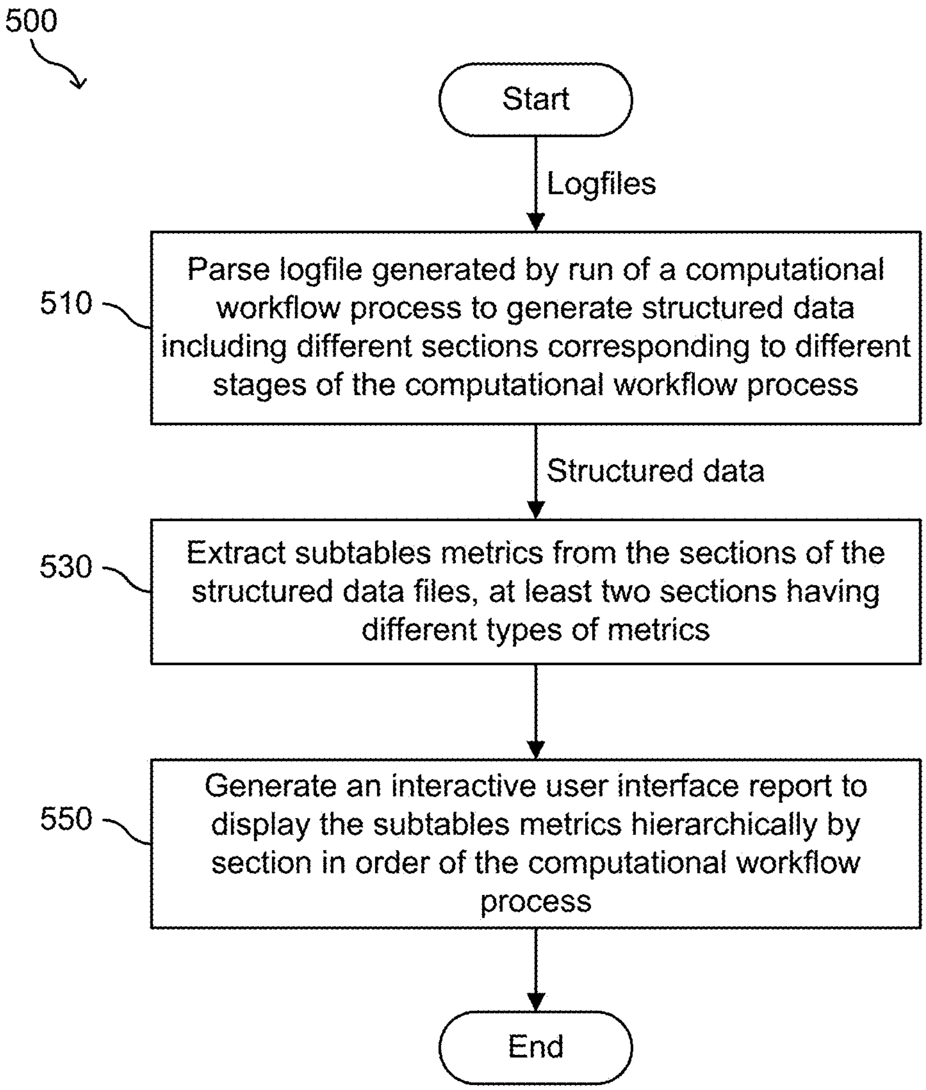
FIG. 5 is a flowchart depicting a method for displaying an interactive report of metrics from a logfile of a computational workflow process, the metrics being organized hierarchically based on stages of the computational workflow process, according to one embodiment of the present disclosure.

FIG. 5 is a flowchart depicting a method 500 for displaying an interactive report of metrics from a logfile of a computational workflow process, the metrics being organized hierarchically based on stages of the computational workflow process, according to one embodiment of the present disclosure. While the examples shown in FIGS. 4B, 4I, 4J, and 4K illustrate examples of the display of subtable where multiple runs (e.g., two runs) are compared, embodiments of the present disclosure are not limited thereto and may also be applied the hierarchical display of data from different sections of a single logfile.

At 510, the processing device parses a logfile generated by run of a computational workflow process to generate structured data including different sections for different stages of the computational workflow process. As noted above, the structured data may be in the form of one or more structured data files in data formats such as CSV, TSV, JSON, XML, BSON, MessagePack, or the like. At 530, the processing device extracts metrics from the structured data files, where at least two of the sections have different types of data (e.g., different sets of metrics and/or text data), such that subtables for these sections have different headers for their respective columns. At 550, the processing device generates an interactive user interface report to display the metrics hierarchically by section in order of the computational workflow process (e.g., the sections are displayed in time sequenced order). The processing device generates user interface such that sections of the report containing the subtables with different types of metrics are displayed with different headers corresponding to the metrics therein.

FIG. 6 illustrates an example set of processes 600 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 610 with information supplied by a designer, information which is transformed to create an article of manufacture that uses a set of EDA processes 612. When the design is finalized, the design is taped-out 634, which is when artwork (e.g., geometric patterns) for the integrated circuit is sent to a fabrication facility to manufacture the mask set, which is then used to manufacture the integrated circuit. After tape-out, a semiconductor die is fabricated 636 and packaging and assembly processes 638 are performed to produce the finished integrated circuit 640.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 6. The processes described by FIG. 6 may be enabled by EDA products (or EDA systems).

During system design 614, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 616, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 618, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 620, the netlist is checked for compliance with timing constraints and for correspondence with the HDL code. During design planning 622, an overall floor plan for the integrated circuit is constructed and analyzed for timing and top-level routing.

During layout or physical implementation 624, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 626, the circuit function is verified at the layout level, which permits refinement of the layout design. During physical verification 628, the layout design is checked to ensure that manufacturing constraints are correct, such as DRC constraints, electrical constraints, lithographic constraints, and that circuitry function matches the HDL design specification. During resolution enhancement 630, the geometry of the layout is transformed to improve how the circuit design is manufactured.

During tape-out, data is created to be used (after lithographic enhancements are applied if appropriate) for production of lithography masks. During mask data preparation 632, the 'tape-out' data is used to produce lithography masks that are used to produce finished integrated circuits.

A storage subsystem of a computer system (such as computer system 700 of FIG. 7) may be used to store the programs and data structures that are used by some or all of the EDA products described herein, and products used for development of cells for the library and for physical and logical design that use the library.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random-access memory (DRAM) such as synchronous DRAM (SDRAM), a static memory 706 (e.g., flash memory, static random access memory (SRAM), etc.), and a data storage device 718, which communicate with each other via a bus 730.

Processing device 702 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 may be configured to execute instructions 726 for performing the operations and steps described herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a non-transitory computer-readable medium) on which is stored one or more sets of instructions 726 or software embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In some implementations, the instructions 726 include instructions to implement functionality corresponding to the present disclosure. While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 702 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method comprising:

parsing, by a processing device, a first logfile generated by a first run of an electronic design automation process and a second logfile generated by a second run of the electronic design automation process to generate first structured data comprising a first workflow step start marker in the first logfile and second structured data comprising a second workflow step start marker in the second logfile;

determining, by the processing device, based on the first structured data and the second structured data, that a first section of the first logfile and a second section of the second logfile correspond to outputs of a same stage of the electronic design automation process based on the first workflow step start marker and the second workflow step start marker;

extracting first metrics from the first section of the first logfile and second metrics from the second section of the second logfile; and generating a user interface to display the first metrics from the first section of the first logfile adjacent to the second metrics from the second section of the second logfile.

2. The method of claim 1, wherein the first section has a position in the first logfile different from a position of the second section in the second logfile, and wherein parsing the first logfile comprises:

identifying the first workflow step start marker at a first position in the first logfile; and determining the position of the first section in the first logfile based on the first position of the first workflow step start marker, and wherein parsing the second logfile comprises:

identifying the second workflow step start marker at a second position in the second logfile; and determining the position of the second section in the second logfile based on the second position of the second workflow step start marker.

3. The method of claim 2, wherein the parsing the first logfile is performed concurrently with the first run of the electronic design automation process.

4. The method of claim 1, wherein the user interface comprises a control configured to select a display mode from a plurality of display modes for displaying the second metrics, the plurality of display modes comprising:

a raw value of a second metric of the second metrics;

a percentage change between the raw value of the second metric and a corresponding metric of a baseline run; and an absolute change between the raw value of the second metric and the corresponding metric of the baseline run.

5. The method of claim 4, wherein the user interface is implemented using hypertext document and a stylesheet, wherein a node of hypertext document corresponding to the second metric comprises a plurality of sub-nodes storing the raw value, the percentage change, and the absolute change, and wherein an interaction with the control of the user interface causes the user interface to modify the stylesheet to make one of sub-nodes visible and to hide the other sub-nodes.

6. The method of claim 4, wherein the user interface comprises a control configured to select a run of a plurality of runs of the electronic design automation process as the baseline run.

7. The method of claim 1, further comprising:

receiving a plurality of first messages extracted from the first logfile and a plurality of second messages extracted from the second logfile;

grouping the plurality of first messages and the plurality of second messages by message type to generate a first plurality of groups of messages from the first logfile and a second plurality of groups of messages from the second logfile;

generating summaries of the first plurality of groups of messages and summaries of the second plurality of groups of messages, a summary of a group of messages comprising a count of messages in the group and a representative example message from the group of messages; and highlighting, in the user interface, a difference between a first summary of a first group of messages from the first logfile and a second summary of a second group of messages from the second logfile.

8. The method of claim 1, wherein the first metrics comprise a first plurality of subtables of metrics and the second metrics comprise a second plurality of subtables of metrics, the first plurality of subtables of metrics and the second plurality of subtables of metrics corresponding to sub-stages of the same stage of the electronic design automation process, and wherein the user interface displays metrics from the first plurality of subtables adjacent to corresponding metrics from the second plurality of subtables in a hierarchy by section in order of the electronic design automation process.

* * * * *